US009599770B2

(12) United States Patent
Englund et al.

(10) Patent No.: US 9,599,770 B2
(45) Date of Patent: Mar. 21, 2017

(54) GRAPHENE PHOTONICS FOR RESONATOR-ENHANCED ELECTRO-OPTIC DEVICES AND ALL-OPTICAL INTERACTIONS

(71) Applicant: The Trustees of Columbia University in the City of New York, New York, NY (US)

(72) Inventors: Dirk R. Englund, New York, NY (US); Xuetao Gan, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 207 days.

(21) Appl. No.: 14/501,735

(22) Filed: Sep. 30, 2014

(65) Prior Publication Data
US 2016/0161675 A1    Jun. 9, 2016

Related U.S. Application Data

(63) Continuation-in-part of application No. PCT/US2013/032373, filed on Mar. 15, 2013.
(Continued)

(51) Int. Cl.
| | |
|---|---|
| G02B 6/293 | (2006.01) |
| G02B 6/122 | (2006.01) |
| G02F 1/01 | (2006.01) |
| G01J 1/42 | (2006.01) |
| B82Y 20/00 | (2011.01) |
| G02B 6/32 | (2006.01) |
| G02F 1/17 | (2006.01) |
| G02F 3/02 | (2006.01) |
| B82B 1/00 | (2006.01) |

(52) U.S. Cl.
CPC .......... *G02B 6/29331* (2013.01); *B82Y 20/00* (2013.01); *G01J 1/42* (2013.01);
(Continued)

(58) Field of Classification Search
CPC ... B82B 1/00; B82Y 20/00; G01J 1/42; G02B 6/1225; G02B 6/29331; G02B 6/32;
(Continued)

(56) References Cited

U.S. PATENT DOCUMENTS

| | | |
|---|---|---|
| 4,717,255 A | 1/1988 | Ulbers |
| 5,431,055 A | 7/1995 | Takata et al. |

(Continued)

FOREIGN PATENT DOCUMENTS

| | | |
|---|---|---|
| EP | 1 432 048 | 6/2004 |
| WO | WO 2010/141114 | 12/2010 |

(Continued)

OTHER PUBLICATIONS

U.S. Appl. No. 14/253,250, filed Apr. 15, 2014.
International Search Report and Written Opinion for PCT/US13/073613, dated May 30, 2014.
International Search Report and Written Opinion for PCT/US13/032373, dated Jun. 13, 2013.
International Search Report and Written Opinion for PCT/US13/052020, dated Dec. 20, 2013.
International Search Report and Written Opinion for PCT/US13/031736, dated Oct. 29, 2013.
International Search Report and Written Opinion for PCT/US12/048837, dated Dec. 27, 2012.
International Search Report and Written Opinion for PCT/US12/048833, dated Apr. 5, 2013.
International Search Report and Written Opinion for PCT/US12/061126, dated Jan. 10, 2013.
Andryieuski et al., "Nanocouplers for infrared and visible light", *Advances in OptoElectronics*, Retrieved from the Internet: URL:http://arxiv.org/ftp/arxiv/papers/1206/1206.6601.pdf (32 pages) (2012).

(Continued)

*Primary Examiner* — Mark R Gaworecki
(74) *Attorney, Agent, or Firm* — Baker Botts L.L.P.

(57) ABSTRACT

Techniques for coupling light into graphene using a planar photonic crystal having a resonant cavity characterized by a mode volume and a quality factor and at least one graphene layer positioned in proximity to the planar photonic crystal to at least partially overlap with an evanescent field of the resonant cavity. At least one mode of the resonant cavity can couple into the graphene layer via evanescent coupling. The optical properties of the graphene layer can be controlled, and characteristics of the graphene-cavity system can be detected. Coupling light into graphene can include electro-optic modulation of light, photodetection, saturable absorption, bistability, and autocorrelation.

20 Claims, 14 Drawing Sheets

Related U.S. Application Data

(60) Provisional application No. 61/618,346, filed on Mar. 30, 2012, provisional application No. 61/709,851, filed on Oct. 4, 2012.

(52) U.S. Cl.
CPC .............. *G02B 6/1225* (2013.01); *G02B 6/32* (2013.01); *G02F 1/0118* (2013.01); *G02F 1/17* (2013.01); *G02F 3/022* (2013.01); *B82B 1/00* (2013.01); *G02F 2202/32* (2013.01); *Y10S 977/755* (2013.01)

(58) Field of Classification Search
CPC ...... G02F 1/0118; G02F 1/17; G02F 2202/32; G02F 3/022
See application file for complete search history.

(56) References Cited

U.S. PATENT DOCUMENTS

| | | |
|---|---|---|
| 5,455,421 A | 10/1995 | Spears |
| 5,493,393 A | 2/1996 | Beranek et al. |
| 5,565,987 A | 10/1996 | Jain et al. |
| 5,760,939 A | 6/1998 | Nagarajan et al. |
| 6,069,645 A | 5/2000 | Vincent |
| 6,157,042 A | 12/2000 | Dodd |
| 6,512,866 B1 | 1/2003 | Fan et al. |
| 6,584,126 B2 | 6/2003 | Wang et al. |
| 6,614,533 B1 | 9/2003 | Hata et al. |
| 6,752,008 B1 | 6/2004 | Kley |
| 7,091,500 B2 | 8/2006 | Schnitzer et al. |
| 7,184,642 B2 | 2/2007 | Hoshi et al. |
| 7,347,085 B2 | 3/2008 | Taber |
| 7,356,225 B2 | 4/2008 | Loebel et al. |
| 7,359,111 B1 | 4/2008 | Bratkovski |
| 7,406,860 B2 | 8/2008 | Zhou et al. |
| 7,474,811 B1 | 1/2009 | Quitoriano et al. |
| 7,572,648 B2 | 8/2009 | Suzuki et al. |
| 7,592,632 B2 | 9/2009 | Takagi |
| 7,599,061 B1 | 10/2009 | Ting et al. |
| 7,659,536 B2 | 2/2010 | Krishna et al. |
| 7,817,274 B2 | 10/2010 | Zhang |
| 8,053,782 B2 | 11/2011 | Avouris et al. |
| 8,116,624 B1 | 2/2012 | Wach |
| 8,189,302 B2 | 5/2012 | Gurney et al. |
| 8,213,751 B1 | 7/2012 | Ho et al. |
| 8,263,986 B2 | 9/2012 | Hajj-Hassan et al. |
| 2001/0055147 A1 | 12/2001 | Little et al. |
| 2002/0068018 A1 | 6/2002 | Pepper et al. |
| 2003/0020926 A1 | 1/2003 | Miron |
| 2004/0067163 A1 | 4/2004 | Prasad et al. |
| 2004/0150873 A1 | 8/2004 | Pearsall |
| 2004/0156610 A1 | 8/2004 | Charlton et al. |
| 2004/0179803 A1 | 9/2004 | Bourelle |
| 2005/0110992 A1 | 5/2005 | Scherer et al. |
| 2005/0218328 A1 | 10/2005 | Suzuki et al. |
| 2006/0058685 A1 | 3/2006 | Fomitchov et al. |
| 2006/0092414 A1 | 5/2006 | Geshwind et al. |
| 2006/0188721 A1 | 8/2006 | Irvin et al. |
| 2006/0237639 A1 | 10/2006 | Kley |
| 2006/0283338 A1 | 12/2006 | Degertekin |
| 2007/0020144 A1 | 1/2007 | Du et al. |
| 2007/0107501 A1 | 5/2007 | Taber |
| 2008/0011065 A1 | 1/2008 | Su et al. |
| 2008/0089367 A1 | 4/2008 | Srinivasan et al. |
| 2008/0159679 A1 | 7/2008 | Sigalas et al. |
| 2008/0223119 A1 | 9/2008 | Phan et al. |
| 2009/0015757 A1 | 1/2009 | Potts et al. |
| 2009/0237666 A1 | 9/2009 | Vollmer et al. |
| 2009/0273779 A1 | 11/2009 | Baumberg et al. |
| 2010/0014077 A1 | 1/2010 | Khetani et al. |
| 2010/0117647 A1 | 5/2010 | Madore |
| 2010/0142569 A1 | 6/2010 | Magel |
| 2010/0176200 A1 | 7/2010 | Vollmer et al. |
| 2010/0202035 A1 | 8/2010 | Noh et al. |
| 2010/0275334 A1 | 10/2010 | Proksch et al. |
| 2011/0042650 A1 | 2/2011 | Avouris et al. |
| 2011/0149296 A1 | 6/2011 | Tearney et al. |
| 2011/0151602 A1 | 6/2011 | Speier |
| 2011/0158268 A1 | 6/2011 | Song |
| 2011/0167525 A1 | 7/2011 | Humphris |
| 2011/0175060 A1 | 7/2011 | Okai et al. |
| 2011/0269259 A1 | 11/2011 | Tatani et al. |
| 2011/0280263 A1 | 11/2011 | Kieu et al. |
| 2011/0296929 A1 | 12/2011 | Tohmyoh et al. |
| 2012/0039344 A1 | 2/2012 | Kian et al. |
| 2012/0044489 A1 | 2/2012 | Chakravarty et al. |
| 2012/0045169 A1 | 2/2012 | Hu et al. |
| 2012/0069338 A1 | 3/2012 | Afzali et al. |
| 2012/0126143 A1 | 5/2012 | Himmelhaus |
| 2012/0206726 A1 | 8/2012 | Pervez et al. |
| 2012/0219250 A1 | 8/2012 | Ren et al. |
| 2012/0268745 A1 | 10/2012 | Kudenov et al. |
| 2012/0298971 A1 | 11/2012 | Lee et al. |
| 2014/0160336 A1 | 6/2014 | Englund et al. |
| 2014/0196179 A1 | 7/2014 | Englund et al. |
| 2014/0233028 A1 | 8/2014 | Englund et al. |

FOREIGN PATENT DOCUMENTS

| | | |
|---|---|---|
| WO | WO 2011/046875 | 4/2011 |
| WO | WO 2011/089119 | 7/2011 |
| WO | WO 2012/115793 | 8/2012 |
| WO | WO 2012/128943 | 9/2012 |

OTHER PUBLICATIONS

Ban et al., "Near-infrared to visible light optical upconversion by direct tandem integration of organic light-emitting diode and inorganic photodetector", *Applied Physics Letters*, 90:093108 (2007).

Bao et al., "Graphene photonics, plasmonics, and broadband optoelectronic devices", *ACS Nano*, 6(5):3677-3694 (2012).

Bonaccorso et al., "Graphene photonics and optoelectronics", *Nature Photonics*, 4:611-622 (2010).

Boriskina et al., "Spectrally engineered photonic molecules as optical sensors with enhanced sensitivity: a proposal and numerical analysis", *JOSA B*, 23(8):1565-1573 (2006).

Bullis, "Graphene Transistors", *MIT Technology Review*, (Jan. 28, 2008); Retrieved from http://www.technologyreview.com/news/409449/graphene-transistors/ [downloaded on Oct. 23, 2014].

Butler et al., Nomenclature, symbols, units and their usage in spectrochemical analysis-IX. Instrumentation for the spectral dispersion and isolation of optical radiation (IUPAC Recommendations 1995), *Pure and Applied Chemistry*, 67(10):1725-1744 (1995).

Craven-Jones et al., "Infrared hyperspectral imaging polarimeter using birefringent prisms", *Appl. Opt.*, 50(8):1170-1185 (2011).

DeCorby et al., "Chip-scale spectrometry based on tapered hollow Bragg waveguides", *Optics Express*, 17(19):16632-16645 (2009).

Fang et al., "Graphene-antenna sandwich photodetector", *Nano Letters*, 12(7):3808-3813 (2012).

Furchi et al., "Microactivity-integrated grapheme photodetector", *Nano Letters*, 12(6):2773-2777 (2012).

Gan et al., "A high-resolution spectrometer based on a compact planar two dimensional photonic crystal cavity array", *Applied Physics Letters*, 100:231104 (4 pages) (2012).

Geim et al., "The rise of grapheme", *Nature Materials*, 6(3):183-191 (2007).

Huang et al., "Study of residual background carriers in midinfrared in As/Ga Sb superlattices for uncooled detector operation", *Applied Physics Letters*, 92:071102 (2008).

Ismail et al., "Raman spectroscopy with an integrated arrayed-waveguide grating", *Optic Letters*, 36(23):4629-4631 (2011).

Jelezko et al., "Read-out of single spins by optical spectroscopy", *Journal of Physics: Condensed Matter*, 16:R1089-R1104 (2004).

Kim et al., "Graphene-based plasmonic waveguides for photonic integrated circuits", *Optics Express*, 19(24):24557-24562 (2011).

Kuzmenko et al., "Universal optical conductance of graphite", *Phys. Rev. Lett.*, 100(11):117401 (2008).

Lidstone et al., "Label-free imaging of cell attachment with photonic crystal enhanced microscopy", *Analyst*, 136(18):3608-3615 (2011).

Liu et al., "A graphene-based broadband optical modulator", *Nature*, 474(7349):64-67 (2011).

(56) References Cited

OTHER PUBLICATIONS

Lu et al., "Nanoscale graphene electro-optic modulators based on graphene-slot waveguides", *JOSA B*, 29(6):1490-1496 (2012).
Makhlouf et al., "Multispectral confocal microendoscope for in vivo and in situ imaging", *Journal of Biomedical Optics*, 13(4):044016 (2008).
Pisani et al., "Compact imaging spectrometer combining fourier transform spectroscopy with a Fabry-Perot interferometer", *Optics Express*, 17(10):8319-8331 (2009).
Sarkissian et al., "Spectroscopy of a tapered-fiber photonic crystal waveguide coupler", *Optics Express*, 17(13):10738-10747 (2009).
Sheilds et al., "A scanning cavity nanoscope", $41^{st}$ *Annual Meeting of the APS Division of Atomic Molecular and Optical Physics*, 55(5), Tuesday-Saturday, May 25-29, 2010, Houston, Texas.
Tsuji et al., "An efficient and compact difference-frequency-generation spectrometer and its application to $^{12}CH_3D/^{12}CH_4$ isotope ratio measurements", *Sensors (Basel)*, 10(7):6612-6622 (2010).
Wang et al., "Graphene on SiC as a Q-switcher for a 2 μm laser", *Optics Letters*, 37(3):395-397 (2012).
Xia et al., "Ultrafast graphene photodetector", *Nature Nanotechnology*, 4(12):839-843 (2009).
U.S. Appl. No. 14/731,874, filed Jun. 5, 2015.
U.S. Appl. No. 14/074,554, Jan. 22, 2015 Non-Final Office Action.
U.S. Appl. No. 14/074,554, Jun. 17, 2015 Response to Non-Final Office Action.
U.S. Appl. No. 14/074,554, Aug. 17, 2015 Notice of Allowance.
U.S. Appl. No. 14/150,380, May 26, 2015 Notice of Allowance.
U.S. Appl. No. 14/150,380, Aug. 20, 2015 Issue Fee Payment.
U.S. Appl. No. 14/150,389, Nov. 21, 2014 Non-Final Office Action.
U.S. Appl. No. 14/150,389, Jun. 10, 2015 Notice of Abandonment.

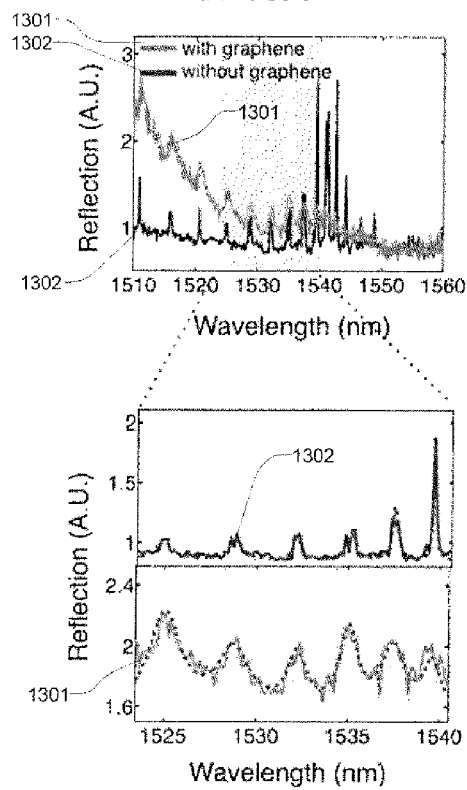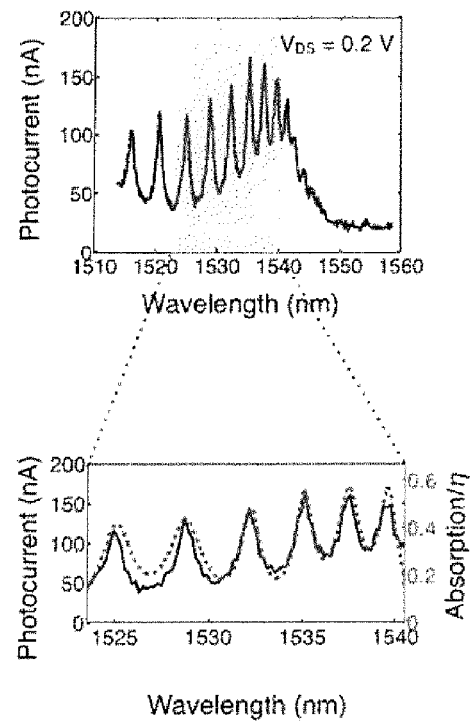
FIG. 13A
FIG. 13B
FIG. 13C
FIG. 13D

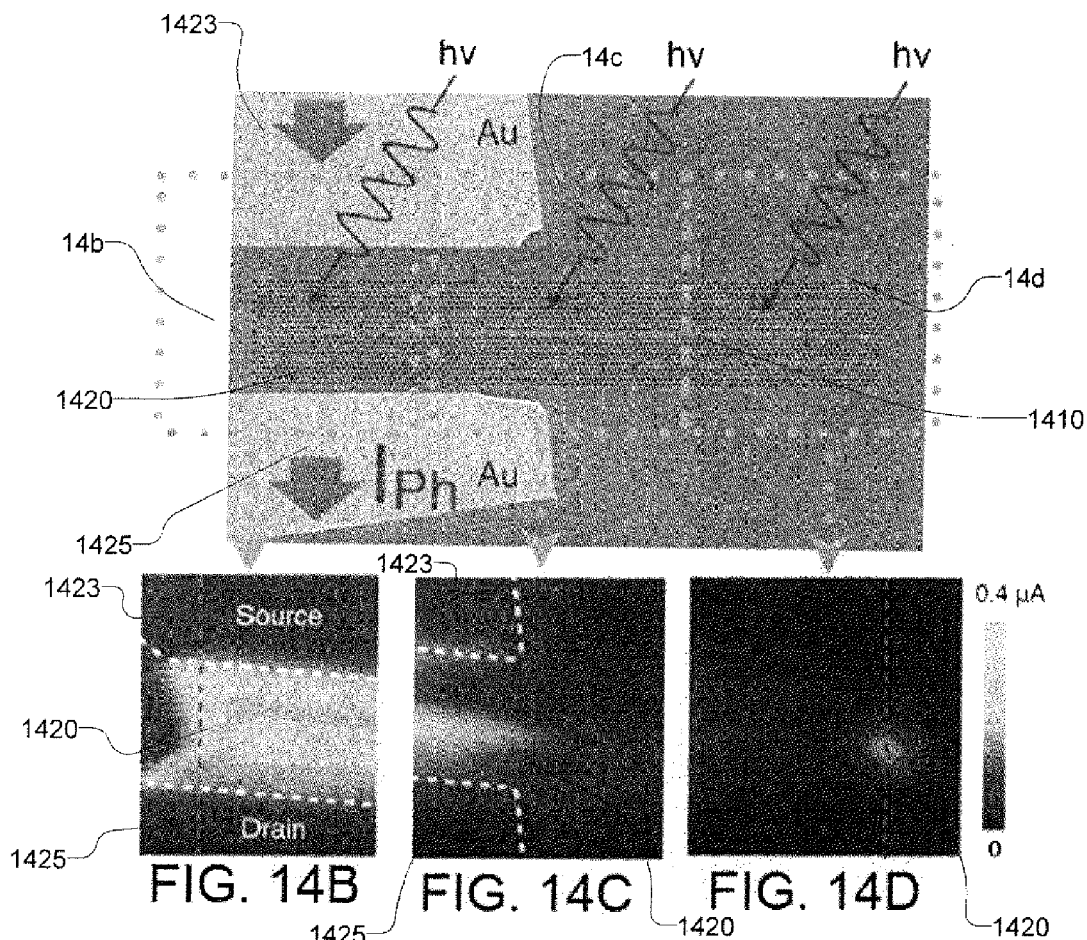
FIG. 14A
FIG. 14B  FIG. 14C  FIG. 14D
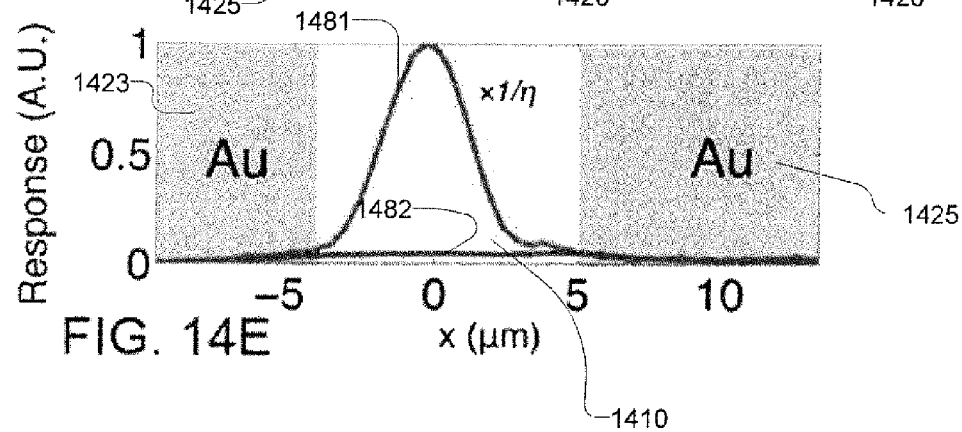
FIG. 14E

GRAPHENE PHOTONICS FOR RESONATOR-ENHANCED ELECTRO-OPTIC DEVICES AND ALL-OPTICAL INTERACTIONS

CROSS-REFERENCE TO RELATED APPLICATIONS

This application is a continuation-in-part of International Patent Application PCT/US13/32373, filed Mar. 15, 2013, which claims the benefit of U.S. Provisional Application Ser. No. 61/618,346, filed Mar. 30, 2012 and U.S. Provisional Application Ser. No. 61/709,851, filed Oct. 4, 2012, each of which is incorporated herein by reference in its entirety and from which priority is claimed.

STATEMENT OF FEDERALLY SPONSORED RESEARCH OR DEVELOPMENT

This invention was made with government support under the DARPA Information in a Photon program, under Grant No. W911NF-10-1-0416 awarded by the Army Research Office, under FA9550-12-0045 PECASE awarded by Air Force Office of Scientific Research PECASE, under Contract No. DE-AC02-98CH10886 awarded by the U.S. Department of Energy, under Award No. DE-SC0001088 awarded by the U.S. Department of Energy, and under Award No. DE-SC0001085 awarded by the U.S. Department of Energy. The government has certain rights in the invention.

BACKGROUND

The disclosed subject matter relates to techniques for coupling light into graphene.

Graphene, which can be configured from a single atomic layer of graphite, can possess certain electronic properties that can be utilized in certain optoelectronic devices, such as photodetectors, tunable broadband modulators, saturable absorbers, and nonlinear media for four-wave mixing. Although the optical absorption of graphene can be considered high given its single atom thickness, it can be relatively low in absolute terms, for example with an absorbance of approximately 2.3% in the near-infrared and visible. A stronger absorption can be useful for many electro-optic and all-optical applications. The absorption, and generally the light-graphene interaction, can be increased using a variety of techniques, including surface plasmon polariton states, which can provide sub-wavelength confinement, guided modes in silicon waveguides, which can allow for 3 dB optical attenuation over a 40 µm channel length, and distributed Bragg reflector microcavities, which can enhance light absorption on the order of 26 times on the resonant wavelength. However, in certain applications where a strong light-matter interaction is desired, further increases in the interaction length of light with graphene is desired. Accordingly, there remains a need for improved techniques for coupling light into graphene.

SUMMARY

The disclosed subject matter provides techniques for techniques for coupling light into graphene, including coupling resonance of a photonic crystal resonant cavity into graphene via evanescent coupling.

In one aspect of the disclosed subject matter, techniques for coupling light into graphene can include using a planar photonic crystal having a resonant cavity. The cavity can be characterized by a mode volume and a quality factor and at least one graphene layer positioned in proximity to the planar photonic crystal to at least partially overlap with an evanescent field of the resonant cavity. At least one mode of the resonant cavity can be coupled into the graphene layer, e.g., via evanescent coupling.

In one embodiment, the mode volume can include a volume on the order of a cubic wavelengths and light input into the resonant cavity can include light having a bandwidth within the near infrared to the visible spectrum. The input light can be coupled into the cavity using a waveguide or an objective lens. The planar photonic crystal can be formed from silicon, germanium, gallium arsenide, gallium phosphide, indium phosphide, or polymers.

In one embodiment, at least one mode of the resonant cavity can be overcoupled into the graphene layer. A voltage source can be electrically coupled via electrodes to the graphene layer and a second layer to create an electric field perpendicular to the graphene layer, and thus induce Pauli blocking to modulate a refractive index of the graphene and provide electro-optic modulation. In one embodiment, at least one mode of the resonant cavity can be critically coupled into the graphene layer. A photocurrent detection circuit can be electrically coupled with the graphene layer to detect photocurrent from at least one mode of the resonant cavity. In one embodiment, a light source can be adapted to vary the intensity of light input into the cavity, and thus saturate the graphene layer and increase the quality factor for the resonant cavity to create a bistability.

In accordance with the disclosed subject matter, one or more optical properties of the graphene layer can be controlled. Light can be coupled into the cavity, and a characteristic in response to the input light can be detected. In one embodiment, the graphene layer can be positioned to achieve a predetermined level of coupling. The graphene layer can be electrically gated to modulate a transmission and refractive index of the graphene. The graphene layer can be electrically gated to enhance a photocurrent in the graphene. Additionally or alternatively, the absorption in the graphene layer can be enhanced by the cavity modes to increase the photocurrent in the graphene. The intensity of the input light can be varied to saturate the graphene and create a bistability. The reflected or transmitted light of the resonant cavity can be detected and processed to detect a modulation of the transmission intensity or to detect a state of the device corresponding to a bistability. The device can be operated as a bistable switch, and optical memory, or an optical logic gate.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

BRIEF DESCRIPTION OF THE DRAWINGS

FIG. 13A depicts a plot of the reflection spectra of a planar photonic crystal cavity integrated with graphene in accordance with an exemplary embodiment of the disclosed subject matter.

FIG. 13B depicts a plot of a portion of the reflection spectra of a planar photonic crystal cavity integrated with graphene for the spectral range 1522-1541 nm in accordance with an exemplary embodiment of the disclosed subject matter.

FIG. 13C depicts a plot of the photocurrent spectra of a planar photonic crystal cavity integrated with graphene in accordance with an exemplary embodiment of the disclosed subject matter.

FIG. 13D depicts a plot of a portion of the photocurrent spectra of a planar photonic crystal cavity integrated with graphene for the spectral range 1520-1540 nm in accordance with an exemplary embodiment of the disclosed subject matter.

FIG. 14A is an image of a planar photonic crystal cavity integrated with graphene in accordance with an exemplary embodiment of the disclosed subject matter.

FIGS. 14B, 14C, and 14D are images depicting the spatial mapping of the photocurrent at three areas indicated in FIG. 14A in accordance with an exemplary embodiment of the disclosed subject matter.

FIG. 14E depicts a plot of the photocurrent in a planar photonic crystal cavity integrated with graphene in accordance with an exemplary embodiment of the disclosed subject matter.

Figure 1A:
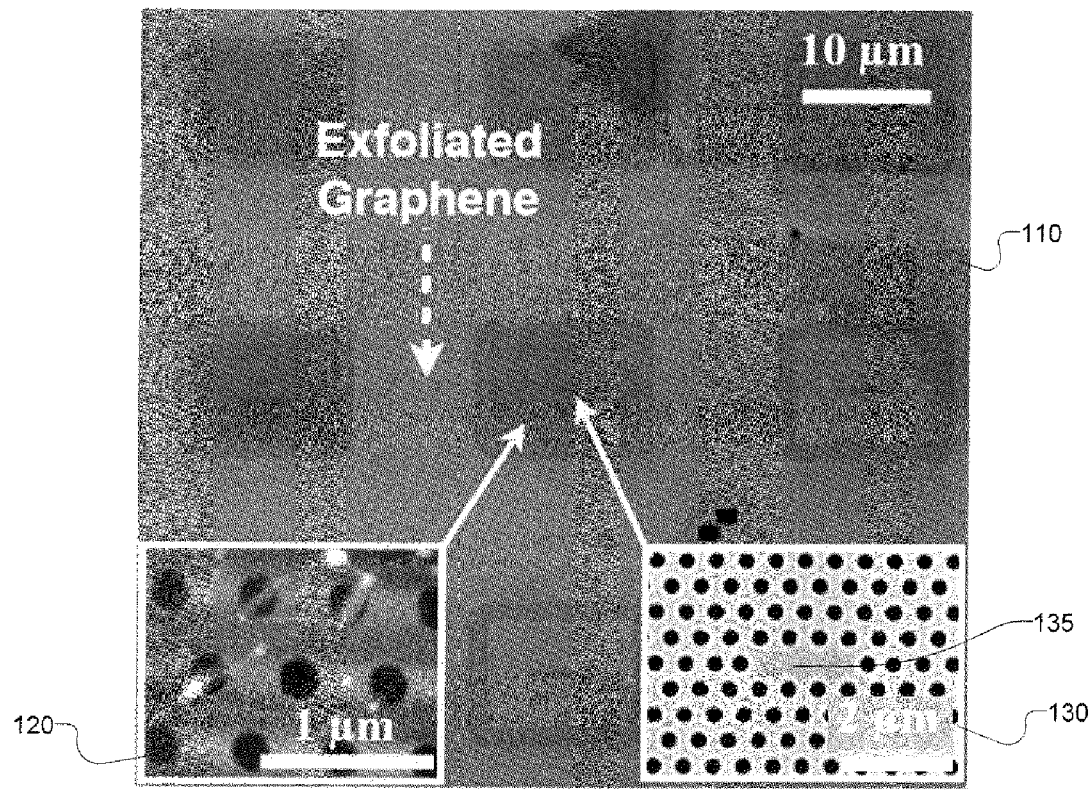
FIG. 1A is an image of planar photonic crystal cavities integrated with graphene in accordance with an exemplary embodiment of the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the Figs., it is done so in connection with the illustrative embodiments.

DETAILED DESCRIPTION

In accordance with the disclosed subject matter, a device for coupling input light from a light source into graphene can include a planar photonic crystal (PPC) with a resonant cavity or an optical resonator with whisper gallery modes characterized by a mode volume and a quality factor. The cavity can be adapted to receive input light into one or more modes. One or more graphene layers can be positioned in proximity to the PPC to at least partially overlap with an evanescent field of the resonant cavity such that at least one mode of the resonant cavity is coupled into the graphene layer via evanescent coupling.

As disclosed herein, the interaction length between light and graphene can be enhanced using a PPC with a resonant cavity coupled to at least one graphene layer. As used herein, the term "light" includes electromagnetic radiation within the visible and infrared spectrums, including both the near-infrared and far-infrared spectrums. The graphene layer can be positioned in proximity to the PPC to at least partially overlap with an evanescent field of the resonant cavity such that at least one mode of the resonant cavity is coupled into the graphene layer via evanescent coupling. The disclosed subject matter can provide enhanced electro-optic modulators, saturable absorbers, bistable switches and optical memories employing saturable absorption, all-optical logic gates employing bistability, broad-band fluorescent generating using continuum of optical transitions near the Dirac point, autocorrelation between ultra-fast pulses, and opto-electronic photodetectors.

The accompanying figures serve to further illustrate various embodiments and to explain various principles and advantages all in accordance with the disclosed subject matter. For purpose of illustration, and not limitation, exemplary embodiments of the disclosed subject matter will now be described with reference to FIGS. 1-11.

Figure 1B:
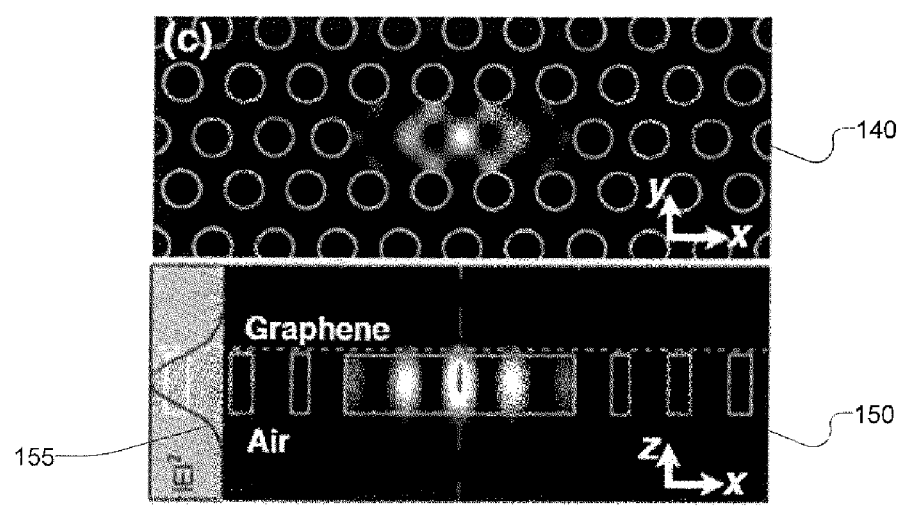
FIG. 1B is a diagram of simulated energy distribution of a fundamental resonant mode of a planar photonic crystal cavity in accordance with and exemplary embodiment the disclosed subject matter.

With reference to FIG. 1A-B, and in accordance with an exemplary embodiment of the disclosed subject matter, PPC cavities can be integrated with graphene. FIG. 1A depicts an optical microscope image 110 of PPC cavities integrated with exfoliated graphene. Inset image 120 is an atomic force microscope image of one photonic crystal cavity integrated with graphene. Image 130 is a scanning electron microscope image of one of the PPC cavities 135 integrated with graphene.

The PPC can be fabricated from a range of materials, including thin membranes of group-IV semiconductors (e.g., silicon or germanium), group III/V compound semiconductors (e.g., gallium arsenide, gallium phosphide, indium phosphide, and the like), or polymer membranes (e.g., PMMA). In an exemplary embodiment, the PPC cavity 135 can have a small mode volume, e.g. on the order of a cubic wavelength. Moreover, the PPC cavity can have a high quality factor ("Q-factor") to mode volume ratio ("Q/V ratio"). Accordingly, the PPC cavity can be any cavity suitable to achieve a small mode volume. In an exemplary embodiment, the PPC cavity 135 can be an L3 cavity, defined by a defect in a lattice of holes through a planar photonic crystal in a regular geometric arrangement. By way of example, and not limitation, the holes can be arranged in a two-dimensional hexagonal array. The defect can include, for example, three linearly aligned missing holes in the lattice. Alternatively, in certain embodiments, the photonic resonator can be in the form of a whispering gallery mode (WGM) resonator, such as for example a ring resonator, a microdisk resonator, or a racetrack resonator.

In an exemplary embodiment, the cavity can be a three-hole defect cavity (L3) in air-can suspended two-dimensional PPCs. For purpose of example, and not limitation. The PPC cavities be fabricated by a combination of electron beam lithography and dry/wet etching steps in a 138 nm thick gallium phosphide (GaP) membrane grown on the top of a 1.2 μm thick sacrificial layer of $Al_{0.85}Ga_{0.15}P$. The PPC cavity patterns can be defined in a resist layer (e.g., ZEP520) by electron-beam lithography and transferred into the GaP membrane by reactive ion etching (e.g., using chlorine-based reactive ion etch). Excess resist can be chemically removed (e.g., with Remover PG). A wet etch can remove the sacrificial layer using hydrofluoric acid, leaving free-standing PPC membranes with high refractive index contrast. The PPCs can be patterned into an air-hole lattice (e.g., a triangular air-hole lattice). The cavity can be formed by three missing holes (i.e., an L3 cavity). The two end holes proximate the cavity can be displaced along the cavity axis, e.g., by 0.15a, to further increase the cavity quality factor, where a is the lattice spacing. Different lattice spacings, a, and air-hole radii can be used to achieve resonant modes with different spectral ranges. For example, cavities with resonance in the near infrared can have a lattice spacing of approximately 470 to approximately 490 nm, and a ratio of air-hole radius to lattice spacing of approximately 0.24. For cavities with resonance in the visible spectrum, the lattice spacing can be between approximately 160 nm to approximately 180 nm, with a ratio of air-hole radius to lattice spacing of approximately 0.29.

For purpose of illustration, and not limitation, FIG. 1B illustrates a top view 140 and cross section 150 of the stimulated energy distribution of the fundamental resonant mode of an exemplary L3 cavity 135. As depicted therein, a graphene layer can be placed in proximity to the cavity 130 such that the graphene layer reacts with the evanescent field 155 of the cavity 135. As described herein, the graphene layer can be positioned relative to the cavity to achieve various coupling efficiencies between the cavity and the graphene layer. For example, in certain embodiments the graphene layer can be positioned so as to achieve overcoupling. As used herein, the term "overcoupling" refers to an arrangement where the graphene layer is positioned at a location relative the cavity where the evanescent field is high. Alternatively, in certain embodiments, the graphene layer can be positioned so as to achieve critical coupling. As used herein, the term "critical coupling" refers to an arrangement where the graphene layer is positioned at a location relative the cavity where the coupling of at least one mode of the cavity into the graphene layer is approximately equal to the coupling of that mode to an input or output mode.

In an exemplary embodiment, the magnitude of the evanescent electric field amplitude ($E_{graphene}$) 155 at the graphene location can correspond to the thickness of the PPC membrane. For example, for a membrane thickness d between d=0.29a to 0.65a, where a is the PPC lattice spacing, 10%-40% of the field 155 maximum ($E_{max}$) can correspond to the center of the structure.

The graphene layer can be formed from either exfoliated graphene or synthesized graphene, for example graphene synthesized using chemical vapor deposition. The graphene layer can be positioned relative the PPC cavity using a variety of techniques as will be understood by those skilled in the art. For example, in one embodiment, the graphene layer can be removed from a parent substrate and transferred onto the PPC cavity using a wet transfer technique. Graphene can be bound to a thin sheet of polymer, such as PMMA. The film can be, for example, between approximately 500 nm and approximately 100 nm. The PMMA can be separated from its substrate by dissolving a soluble sacrificial layer underneath the PMMA, such as PVA (using water) or copper (using a copper etchant). The graphene-polymer membrane can thus float to the top of the liquid (e.g., water or etchant). The graphene-polymer sheet can be lifted off of the surface using a flat surface, such as a glass coverslip. The graphene-polymer sheet can be positioned over the PPC cavity and the glass coverslip can be removed. The polymer sheet can be removed using a solvent such as acetone or by annealing at a sufficient temperature (e.g., 350 degrees Celsius for PMMA). In another embodiment, the graphene layer can be transferred using a dry-transfer technique. For example, graphene can be picked up from a parent substrate using a flexible polymer stamp. The stamp can be made, for example, of PDMS. The graphene can be positioned via the stamp on the PPC cavity, and the stamp can be peeled off in such a way as to leave the graphene behind.

Figure 2:
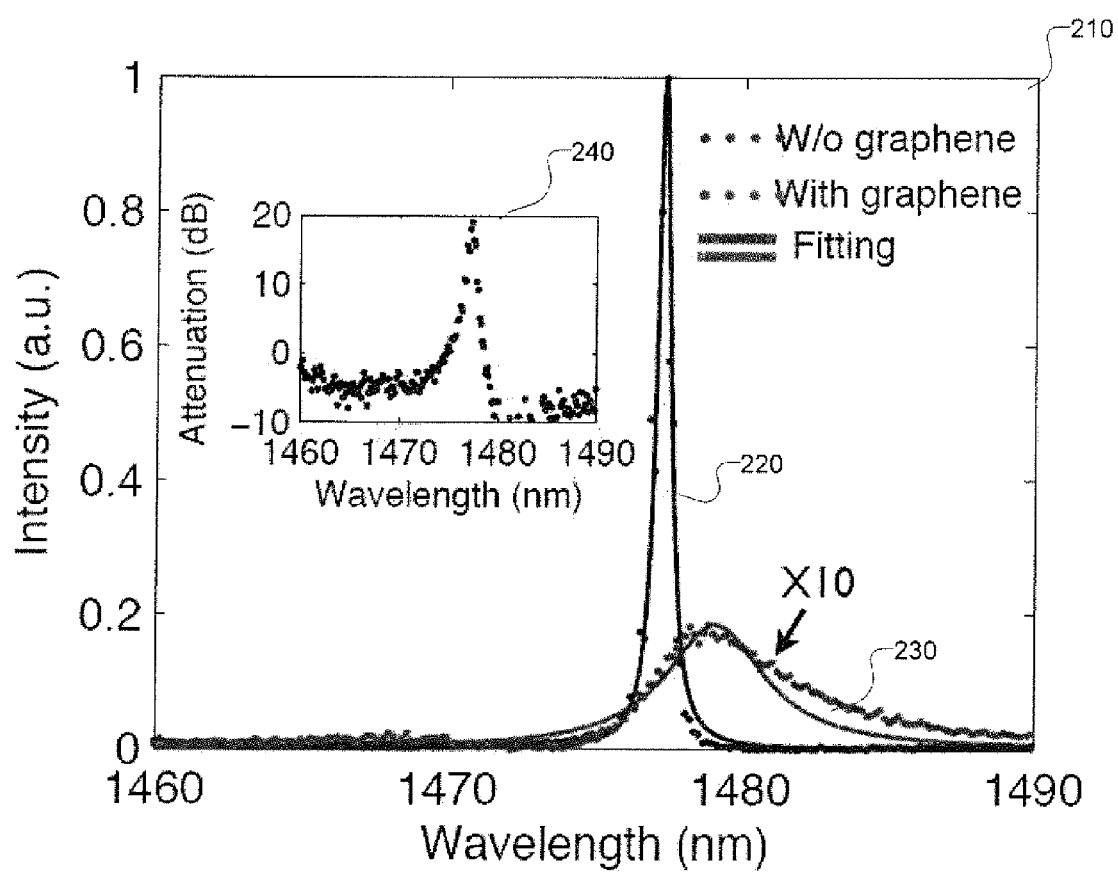
FIG. 2 depicts a plot of the reflection spectra of a planar photonic crystal cavity integrated with graphene in accordance with an exemplary embodiment of the disclosed subject matter.

As disclosed herein, positioning of a graphene layer in proximity to a PPC cavity can provide an enhancement of the light-matter interaction in graphene and light captured in a sub-wavelength nanocavity. FIG. 2 displays an exemplary reflectivity of a cavity 135 such as that shown in FIG. 1 with a lattice spacing of a=480 nm and a hole radius of r=0.24a. Line 220 represents the reflection spectrum ($R_0$) of the unloaded cavity (i.e., before graphene deposition) as recorded with a spectrometer having a resolution of 0.05 nm. As illustrated by line 220, the fundamental mode resonance occurs at approximately 1477.3 nm and has a Q factor of 2,640, as estimated by fitting to a Lorentzian lineshape. Line 230 represents the cavity reflection spectrum ($R_g$) while integrated with the graphene monolayer, which indicates that the Q factor drops to 360, while the resonance is red shifted by approximately 1.8 nm. As depicted in FIG. 2, the relative cavity attenuation, defined as $[-10 \, Log_{10}(R_g/R_0)]$, can increase by 20 dB at the resonance of the unloaded cavity at 1477.3 nm. The full spectrally resolved relative attenuation is shown in inset 240; it can be asymmetric and can include a region of negative relative attenuation owing to the red-shift of the cavity resonance.

Figure 3A:
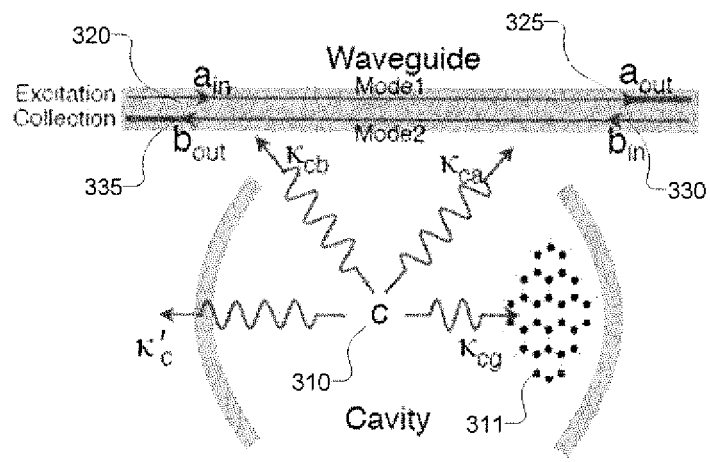
FIG. 3A is a schematic representation of a coupled graphene-cavity model for a planar photonic crystal cavity integrated with graphene in accordance with an exemplary embodiment of the disclosed subject matter.
Figure 3B:
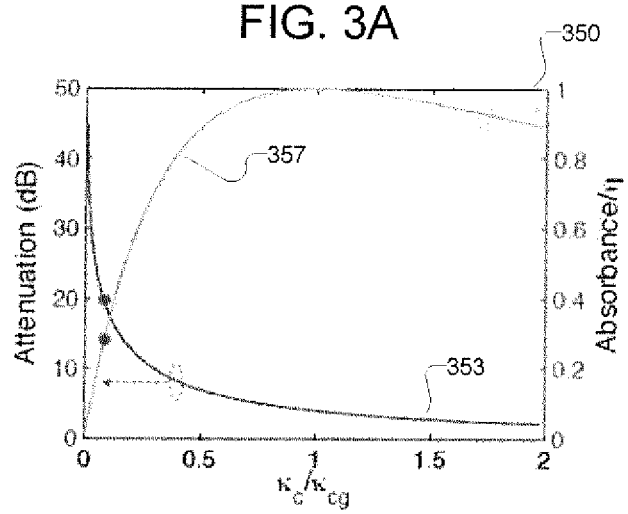
FIG. 3B is a plot of calculated relative attenuation and absorbance of a planar photonic crystal cavity integrated with graphene in accordance with an exemplary embodiment of the disclosed subject matter.
Figure 4A:
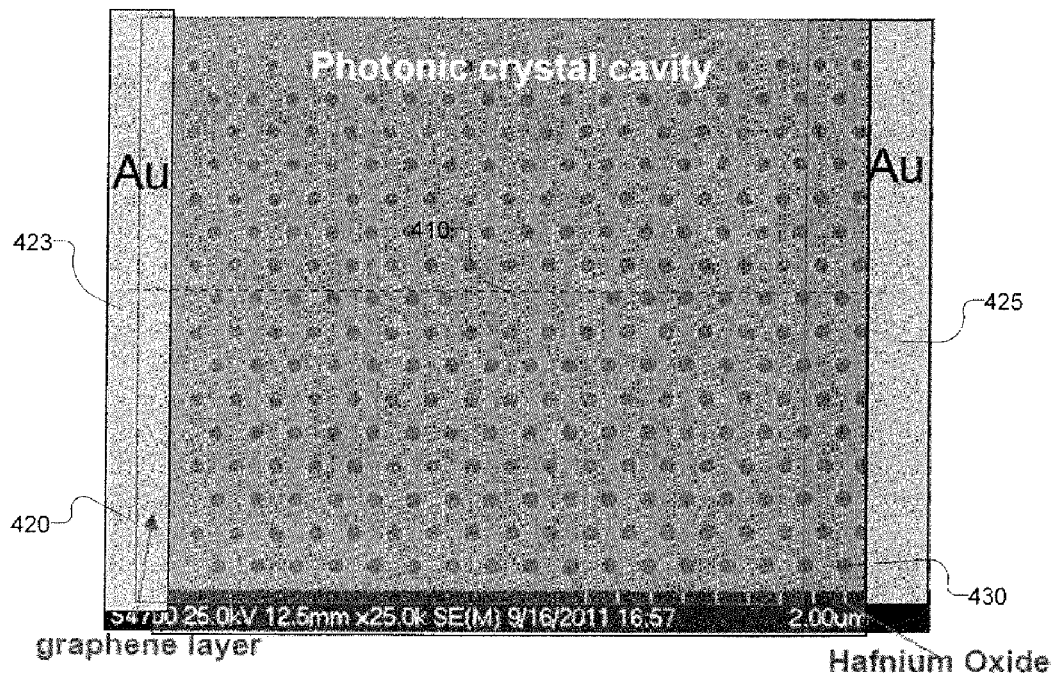
FIG. 4A is a top view of back-gated graphene integrated with a planar photonic crystal cavity in accordance with an exemplary embodiment of the disclosed subject matter.
Figure 4B:
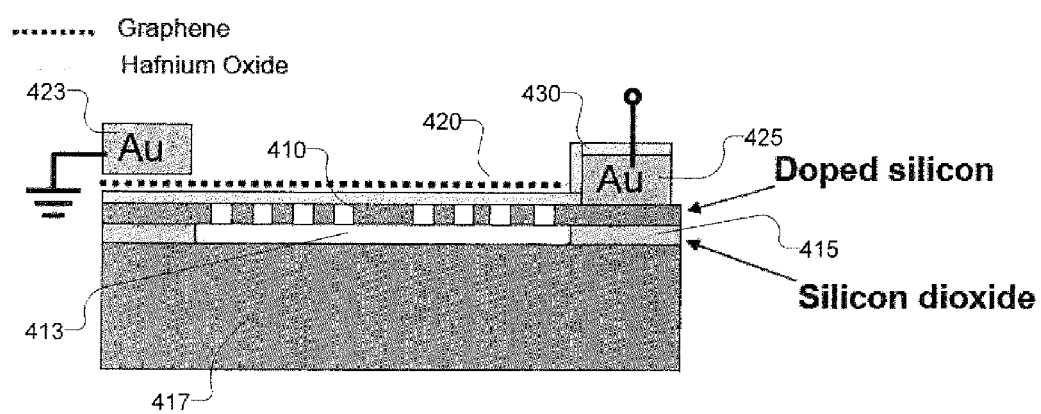
FIG. 4B is a cross sectional view of the back-gated graphene integrated with a planar photonic crystal cavity of FIG. 4A.

For purpose of illustration and not limitation, and with reference to FIG. 3A and FIG. 3B, description will now be made of the principles underlying the enhancement of light-matter interaction using coupled mode theory. When an optical field couples into a mode of an optical cavity, its intensity can be increased in proportion with the mode's $Q/V_{mode}$ ratio of quality (Q) factor to mode volume ($V_{mode}$). PPC nanocavities, which can display a Q factor, e.g., up to $10^6$ and a $V_{mode}$ on the order of a cubic wavelength, can therefore amplify the intensity of incident light by many orders of magnitude. A graphene-cavity system in accordance with the disclosed subject matter can be modeled by coupled mode theory as shown schematically in FIG. 3A. The cavity 310 integrated with graphene 311 can couple with a waveguide through the forward and backward propagating modes of a waveguide, Mode1 and Mode2, at rates of $\kappa_{ca}$ and $\kappa_{cb}$ respectively. The incoming 320 and outgoing 325 light of Mode1 can be denoted $a_{in}$, and $a_{out}$, respectively. Likewise, the incoming 330 and outgoing 335 light of Mode2 can be denoted $b_{in}$ and $b_{out}$, respectively In connection with this exemplary description, the cavity loss arising from the GaP bulk absorption can be ignored because this semiconductor has a large indirect bandgap (~2.26 eV) and an absorption coefficient below 1 cm$^{-1}$. The loss of the unloaded cavity can be caused by out-of-plane radiation with an energy decay rate of $\kappa_c = \omega_0/Q$, where $\omega_0$ is the angular frequency of the cavity resonance. The deposition of the graphene layer can cause an additional cavity loss characterized by an energy decay rate $\kappa_{cg}$, together with a frequency shift $\Delta\omega$ in the cavity resonance. Because the graphene layer 311 is very thin, scattering loss of the cavity 310 caused by the graphene deposition can be neglected.

The excitation mode (Mode1) $a_{in}$ 320 and collected mode (Mode2) $b_{out}$ 335 can be approximated as Gaussian spatial modes, e.g., given by the optics of a confocal microscope used to couple light into and from the cavity. Due to the symmetric confinement, the resonant mode of the PPC cavity can decay equally into the forward and backward propagating waveguide modes. A coupling efficiency, $\eta$, between the excitation and collection modes and the cavity radiation field can be assumed such that the cavity mode couples with the excitation and collection modes with rates $\kappa_{ca} = \kappa_{cb} = \eta \kappa_c$. The steady-state solution to the coupled mode equations can thus yield frequency-dependent reflection $R_g(\omega)$ and absorption $A_g(\omega)$ coefficients of the loaded cavity:

$$R_g(\omega) = \frac{\eta^2 \kappa_c^2}{(\omega_0 + \Delta\omega - \omega)^2 + (\kappa_c/2 + \kappa_{cg}/2)^2} \quad (1)$$

$$A_g(\omega) = \frac{\eta \kappa_c \kappa_{cg}}{(\omega_0 + \Delta\omega - \omega)^2 + (\kappa_c/2 + \kappa_{cg}/2)^2} \quad (2)$$

Equations 1 and 2 can also apply for the unloaded (i.e., without integration with graphene) cavity reflection. $R_0(\omega)$ and the absorption $A_0(\omega)$ coefficients, but with $\kappa_{cg}$ and $\Delta\omega$ set to zero. Fitting the reflection spectra illustrated in FIG. 2 to Equation 1, the following values can be obtained: $\omega_0 = 1:28 \times 10^3$ THz, $\kappa_c = 1.9 \times 10^{-4} \omega_0$, $\Delta\omega = -1.24 \times 10^{-3}(1 \pm 0.016)\omega_0$, and $\kappa_{cg} = 1.24 \times 10^{-3} \omega_0$, where the estimated uncertainties are near those expected for shot noise. The resonance frequency shift $\Delta\omega$ and additional energy decay rate $\kappa_{cg}$ can be comparable in magnitude and are much higher than $\kappa_c$. Accordingly, in connection with this model, the graphene layer can dominate the photon loss with a factor of $\kappa_{cg}/(\kappa_{cg} + \kappa_c) \approx 92\%$ inside the nanocavity.

The perturbation of graphene on the cavity can be determined via numerical simulation of the field-graphene interaction, and the graphene's complex dielectric constant can be deduced. For example, the unloaded cavity's energy density (e.g., as shown in FIG. 1B) can be obtained from a three-dimensional finite-difference time-domain (FDTD) simulation that yields the complex resonant field E(r). Such a simulation can also yield, for example, a Q-factor of Q=7,600, which can depend on the thinness of the GaP slab. The graphene layer can have an anisotropic complex dielectric function with in-plane and perpendicular components given by $(\in_{g1\parallel} + i\in_{g2\parallel})$ and $(\in_{g1\perp} + \in_{g2\perp})$, where $\in_{g2\perp} \approx 0$ for near infrared radiation. Using anisotropic perturbation theory, the graphene absorption rate can be estimated as $$\kappa_{cg} = \omega_0 \frac{\int d^3 r \varepsilon_{g2\parallel}(r)|E_\parallel(r)|^2}{\int d^3 r \varepsilon_s(r)|E(r)|^2}, \quad (3)$$

and the cavity frequency shift can be estimated as $$\Delta\omega = -\frac{1}{2}\omega_0 \frac{\int d^3 r((\varepsilon_{g1\parallel}(r)-1)|E_\parallel(r)|^2 + (\varepsilon_{g1\perp}(r)-1)|E_\perp(r)|^2)}{\int d^3 r \varepsilon_s(r)|E(r)|^2}, \quad (4)$$

where $E_\parallel(r)$ and $E_\perp(r)$ are the in-plane and perpendicular components of E(r), and $\in_s = 9.36$ denotes the dielectric constant of a GaP substrate near $\omega_0$. A measured coupling rate of the cavity mode into graphene can thus yield a value for the imaginary part of graphene's dielectric function around the input wavelength. Determination of the real part of graphene's dielectric constant can be accomplished by employing a multi-mode cavity that provides multiple independent in-plane and perpendicular components of each resonant mode to resolve $\in_{g1\parallel}$ and $\in_{g1\perp}$. Alternatively, reported values of the dielectric constant of the substrate, e.g., $\in_{g1\parallel}$=4.64 and $\in_{g1\perp}$=2.79, can be used to verify measured frequency shift $\Delta\omega$.

The expected reflection attenuation and absorption of an exemplary cavity integrated with graphene can thus be estimated as a function of the intrinsic cavity loss rate $\kappa_c$, the waveguide coupling efficiency $\eta$, and the graphene loss rate $\kappa_{cg}$. Based on the theoretical model of Equations 1 and 2, the predicted value for the relative cavity attenuation, $-10\,\text{Log}_{10}(T_g/T_0)$, induced by the presence of graphene, can be determined as a function of the ratio of the loss rate of the unloaded cavity to that for graphene, $\kappa_c/\kappa_{cg}$. For purpose of illustration, and not limitation, FIG. 3B illustrates a plot of the predicted value for the relative cavity attenuation 353 and absorbance 357. For a cavity with high Q, the added attenuation from a single layer of graphene can be as high as 40 dB (at the frequency of the original resonance). A modulation of this magnitude can be achieved with existing PPC cavities (Q~$10^6$). Even when $\kappa_c \approx \kappa_{cg}$, the reflection can still decrease by about 5 dB.

The absorption into graphene at the cavity resonance, $$\frac{\eta \kappa_c \kappa_{cg}}{(\kappa_c/2 + \kappa_{cg}/2)^2}, \qquad (5)$$

can reach its maximum value of $\eta$ when $\kappa_c=\kappa_{cg}$, as shown by curve 357. The condition for maximum absorption can be understood as follows: if $\kappa_c>\kappa_{cg}$, photons can decay from the cavity before being absorbed by the graphene layer; alternatively, if $\kappa_c<\kappa_{cg}$, photons are not efficiently coupled into the cavity in the first place. For enhanced absorption, the above equations show a linear dependence on $\eta$. This coupling efficiency can exceed 45%, for example using on-chip side-coupling into the cavity from a waveguide, or tapered fiber coupling. By employing efficient coupling and choosing $\kappa_c \sim \kappa_{cg}$, the model indicates 45% absorption into a monolayer of graphene can be achieved, which can be improved further by placing a reflector under the cavity.

Thus, in accordance with the disclosed subject matter, PPC cavities can be designed with lower intrinsic Q (higher $\kappa_c$) and/or fabricated on thicker slab (lower $\kappa_{cg}$) to substantially satisfy the condition that $\kappa_c=\kappa_{cg}$, so as to increase the absorption of light by a graphene layer defined by the cavity coupling efficiency $\eta$. Various coupling strategies, such as tapered fiber or on-chip waveguide couplers can be used. By incorporating graphene into a cavity with travelling wave resonant modes, such as a ring resonator, high optical absorption can also be achieved.

The techniques disclosed herein can also provide for an electro-optic modulator which can be operated at low tuning voltages. In an exemplary embodiment, with reference to FIG. 4A and FIG. 4B, the graphene layer can be positioned relative the PPC cavity such that it interacts with the evanescent field of the cavity where the evanescent field is high (e.g., where at least one mode of the resonant cavity is substantially overcoupled into the graphene layer). A voltage source electrically coupled via a first electrode 423 to the graphene layer 420, and via a second electrode 425 to a second layer to create an electric field perpendicular to the graphene layer 420 upon application of a voltage. The voltage source can be adapted to apply a voltage tuned to induce Pauli blocking and thereby modulate a transmission and refractive index of the graphene layer, thereby providing electro-optic modulation.

In connection with this exemplary embodiment, the PPC cavity 410 can be an L3 cavity formed in a doped silicon plane. The doped silicon plane can be positioned on silicon dioxide supports 415 such that the cavity 410 is adjacent an air gap 413 or other low-index material. In this manner, the contrast in index of refraction below the cavity 410 can be increased. The second layer to which the second electrode 425 is attached can be, for example, a transparent contact such as indium tin oxide (ITO), a second graphene sheet, a conductive polymer, or an electrolyte. In certain embodiments, the second electrode 425 can be coupled to a silicon substrate 417 supporting the planar photonic crystal. As depicted in FIG. 4, the second layer 430 can be hafnium oxide. The second layer 430 can be arranged in a number of configurations suitable to induce an electric field perpendicular to the graphene layer. For example, the second layer 430 can be arranged adjacent to the planar photonic crystal opposite the graphene layer 420, between the graphene layer 420 and the PPC cavity 410, or adjacent the graphene layer 420 opposite the PPC cavity 410.

The thickness of the contact layer 430 can be, e.g., on the order of nanometers or tens of nanometers, and thus tuning voltages in the region of several volts to sub-volts can be employed. That is, for example, owing to the small volume and capacitance created over the contact layer and graphene, low switching powers, e.g., on the order of fJ/bit can be used.

Figure 5A:
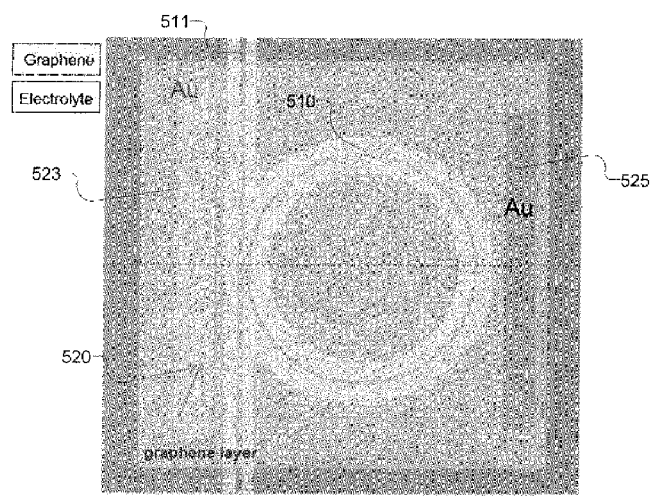
FIG. 5A is a top view of electrolyte graphene integrated with a ring resonator in accordance with an exemplary embodiment of the disclosed subject matter.
Figure 5B:
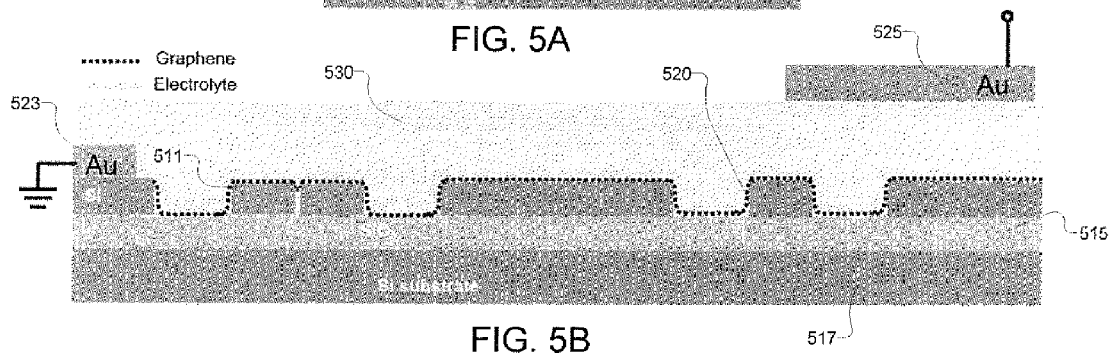
FIG. 5B is a cross sectional view of the electrolyte graphene integrated with a ring resonator of FIG. 5A.

For purpose of example, with reference to FIG. 5A and FIG. 5B, a whispering gallery mode resonator (e.g., a ring resonator 510) can be used. For example, a ring resonator 510 can be patterned in a silicon-on-insulator (e.g., a silicon layer on a layer of silicon dioxide 515). The silicon on-insulator can further be supported by a silicon substrate base 517. The silicon can be further patterned to include a silicon waveguide 511 adapted to couple light into and out of the ring resonator 510. A layer of graphene 520 can be positioned over the ring resonator 510 can be coupled to a first electrode 523. An electrolyte layer 530 can be used as the second layer, and electrically coupled with a second electrode 525. A voltage source, electrically coupled to the first and second electrodes, can create an electric field through the electrolyte layer 530 perpendicular to the graphene layer 510.

For purpose of illustration, and not limitation, an exemplary embodiment providing for high-contract electro-optic modulation of cavity reflection will be described with reference to FIGS. 6A-C in connection with the use of electrical gating of a graphene monolayer using an electrolyte. One of ordinary skill in the art will appreciate that electrical gating of the graphene with an electrolyte can be slower than certain other gating techniques, and that such other gating techniques can be substituted.

Figure 6A:
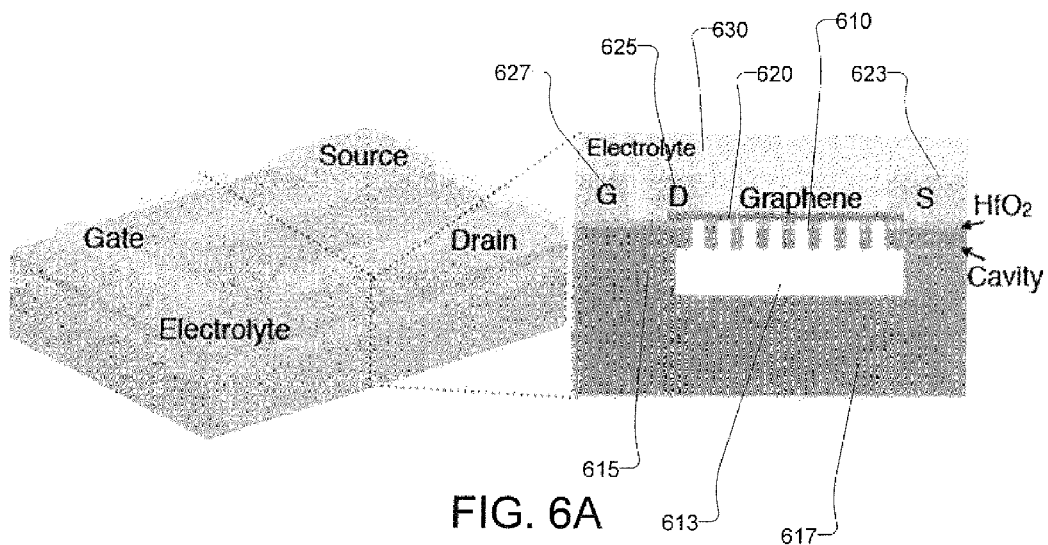
FIG. 6A is a schematic diagram of electrically controlled graphene integrated with a planar photonic crystal cavity in accordance with an exemplary embodiment of the disclosed subject matter.
Figure 6B:
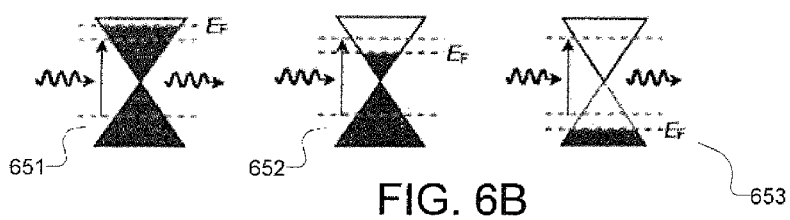
FIG. 6B is a schematic diagram of the band structure of graphene with different doping level in accordance with an exemplary embodiment of the disclosed subject matter.
Figure 6C:
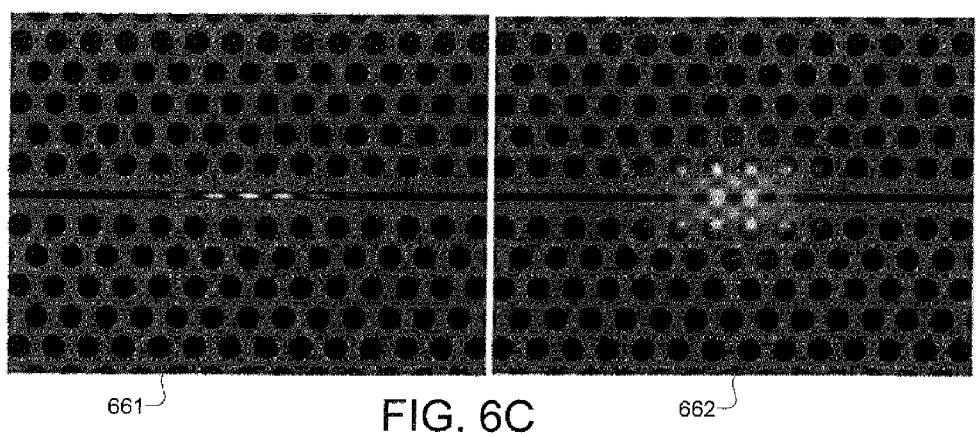
FIG. 6C illustrates the stimulated energy distribution of two resonant modes of an air-slot cavity in a planar photonic crystal in accordance with an exemplary embodiment of the disclosed subject matter.

FIG. 6A depicts an air-suspended PPC cavity 610 coupled to a graphene field effect transistor (FET) gated by a solid electrolyte 630. That is, for example, a PPC can be disposed on silicon dioxide supports 615 on a silicon substrate base 617 to create an air cavity 613 adjacent the PPC cavity 610. A layer of graphene 620 can be positioned adjacent the PPC cavity 610. A source electrode 623 and drain electrode 625 can be electrically coupled with the graphene layer, and a gate electrode 627 can be electrically coupled with the electrolyte 630. The PPC cavity can be, for example, an air-slot PPC cavity. The PPC cavity 610 can be, for example, fabricated on a silicon-on-insulator wafer with a 220 nm thick silicon membrane, using a combination of electron beam lithography and dry/wet etching steps as described herein. The drain 625, source 623, and gate 627 electrodes can be fabricated using electron beam lithography and titanium-gold electron beam evaporation. In one embodiment, a conformation layer of hafnium oxide (e.g., 10 nm thick) can be grown on the PPC using atomic layer deposition before fabrication of the electrodes to avoid gating of the intrinsic of lightly doped silicon membrane directly.

The optical transmission of graphene for an incident photon with frequency v can be modulated by electrostatic tuning of the graphene layer's 620 Fermi energy ($E_F$). As illustrated in FIG. 6C, when $E_F$ is tuned away from the Dirac point by more than half of the photon energy v/2, the interband transitions can be inhibited, reducing graphene absorption. FIG. 6C illustrates the stimulated energy distribution of two resonant modes (661 and 662) of an exemplary air-slot cavity. The air-slot PPC nanocavity can include strongly confined modes in the air gap and thus enhanced coupling between the graphene and cavity modes. FIG. 6B illustrates the band structure of graphene with different doping level, wherein 651 and 653 correspond to graphene with inhibited interband transmission, and 652 corresponds to uninhibited interband transmission.

Figure 7A:
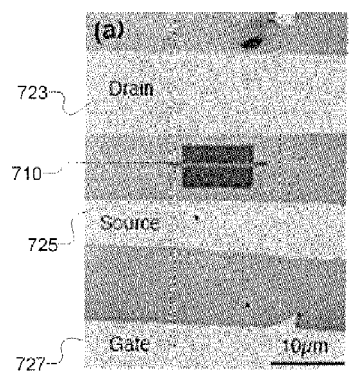
FIG. 7A is an optical image of electrically controlled graphene integrated with a planar photonic crystal cavity in accordance with an exemplary embodiment of the disclosed subject matter.
Figure 7B:
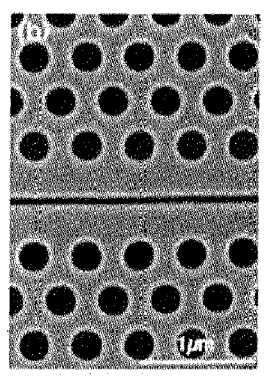
FIG. 7B is a scanning electron microscope image of an air-slot cavity in a planar photonic crystal prior to graphene deposition.

FIG. 7A displays an optical image of an exemplary graphene-PPC nanocavity device in accordance with this exemplary embodiment. As illustrated in FIG. 7A, the gate electrode 727 can be positioned approximately 15 μm from the graphene layer to ensure effective doping through the electrolyte. The source 725 and drain 723 electrodes can be positioned on opposite sides of the PPC nanocavity 710. FIG. 7B shows a scanning electron microscope image of the slot cavity 710 with lattice spacing of a=450 nm and lattice hole-radii of r=150 nm. The electrolyte, which can be, for example PEO plus $LiClO_4$), can be spin coated onto the device which can provide a high electric field and carrier density in graphene.

For purpose of illustration, and not limitation, the exemplary embodiment described in connection with FIG. 6 and FIG. 7 will be characterized using a cross polarization confocal microscope with a broad-band excitation source as depicted schematically in FIG. 8. For example, a confocal microscope can include an objective 820 adapted to couple light into and from the PPC cavity 810. A half wave plate 830 can be arranged to rotate input and output polarizations to achieve arbitrary orientation with respect to the cavity axis. The input field can be polarized at 45° relative to the linearly polarized cavity mode, and the collected reflection field can be polarized at −45° relative to the cavity mode. A polarized beam splitter 840 can separate the input and output light for observation. The reflection can be analyzed using a spectrometer, e.g., with resolution of 0.05 nm.

Figure 7C:
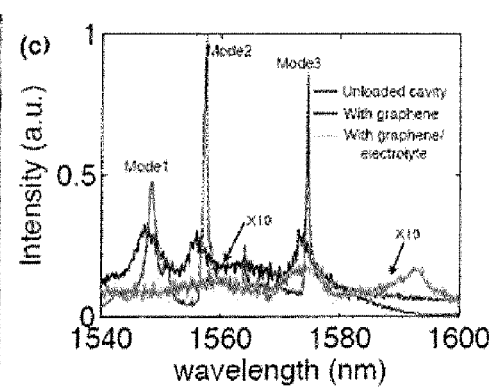
FIG. 7C illustrates the reflection spectra of the intrinsic planar photonic crystal cavity integrated with graphene of FIG. 7A and after deposition of an electrolyte layer.
Figure 8:
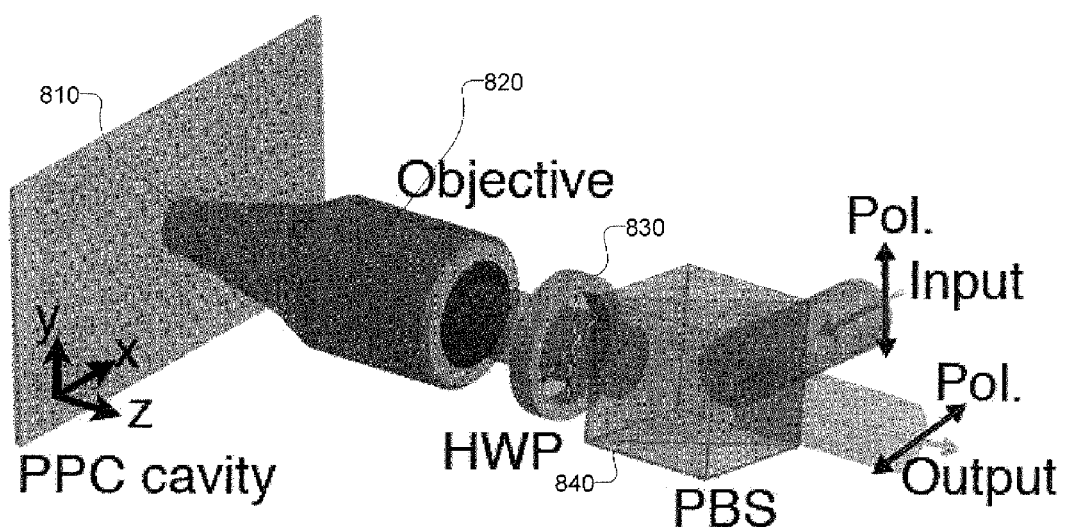
FIG. 8 is a schematic diagram of a cross-polarization confocal microscope setup for coupling light into graphene integrated with a planar photonic crystal cavity in accordance with an exemplary embodiment of the disclosed subject matter.

With reference to FIG. 7C, the slot cavity 710 of FIG. 7A can have three dominant resonant modes at wavelengths of approximately 1548.4 nm (Mode1), 1557.4 nm (Mode2), and 1574.5 nm (Mode3). As depicted, the intrinsic cavity resonances can shift resonance (e.g., "blue-shift") upon application of the graphene layer. Application of the electrolyte can also shift the resonances (e.g., "red-shift"). As depicted in FIG. 7C, Mode1 and Mode2 can become indistinguishable after graphene and electrolyte deposition because they can experience different shifts due to different overlap with the electrolyte.

Figure 9:
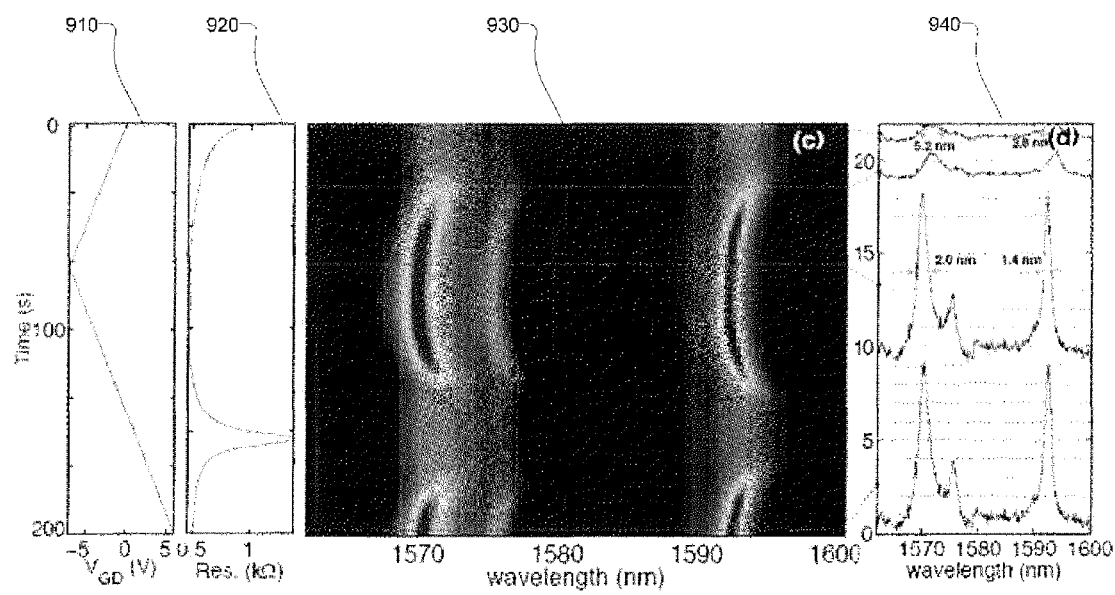
FIG. 9 illustrates the electrical and optical response of an electrically controlled planar photonic crystal integrated with graphene in accordance with an exemplary embodiment of the disclosed subject matter.

The cavity reflectance can be measured as a function of the gate voltage $V_g$ across the gate 727 and drain 723 electrodes. For example, the electrical signal through the drain and source electrodes can be simultaneously monitored to record the doping level of the graphene layer. FIG. 9 shows exemplary measurements of the electrical and optical signals as the gate voltage $V_g$ is linearly modulated. For example, FIG. 9 illustrates the voltage $V_g$ modulated in a saw-tooth pattern 910 at a rate of 0.1 V/s between −7V and 6V. The DC resistance 920 across the graphene layer from the source to drain electrodes shows a charge neutral point at $V_{CN}$=1.4 V. FIG. 9 also shows the reflection spectra 930 of the cavity as $V_g$ is modulated, and the spectra of the cavity reflection for $V_g$=0, −2, −7 and 6V 940, normalized by the reflection peak at $V_g$−0.

Figure 10A:
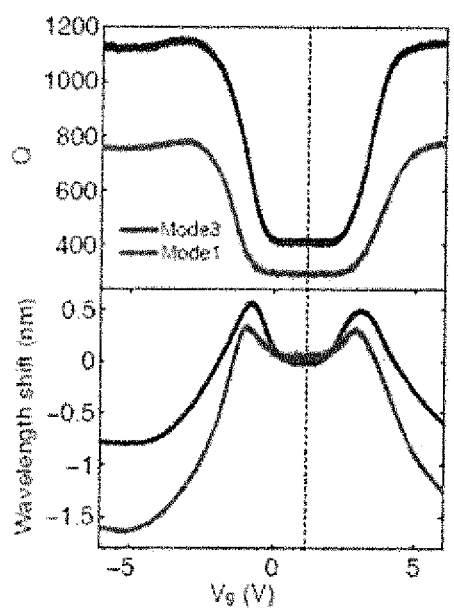
FIG. 10A illustrates the relationship between quality factor and wavelength shift for modes of a planar photonic crystal cavity integrated with graphene and gate voltage in accordance with an exemplary embodiment of the disclosed subject matter.
Figure 10B:
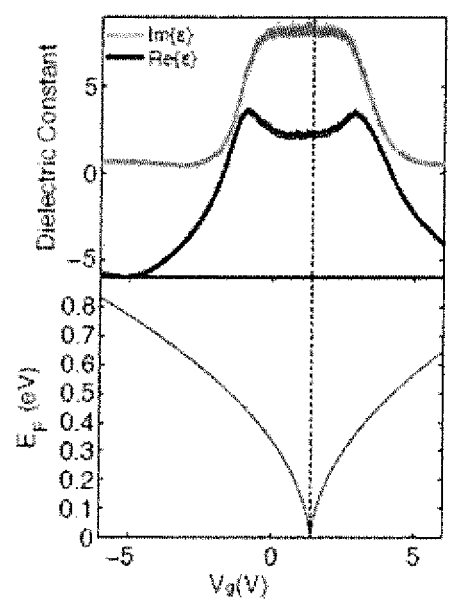
FIG. 10B illustrates the relationship between complex dielectric constant and Fermi level for graphene integrated with a planar photonic crystal cavity and gate voltage in accordance with an exemplary embodiment of the disclosed subject matter.

Tuning the graphene Fermi level by decreasing $V_g$ to −1 V, resonant peaks can become narrower and shift in resonance. As the cavity loss is reduced, the cavity reflection intensity can increase. Further decreasing $V_g$ can result in increased and narrowed peaks over a voltage range of approximately 1.5 V, while center wavelengths can shift in resonance towards blue. Moreover, the resonant modes 930 can be fit with a Lorentzian lineshape to obtain Q-factors and resonant wavelengths as a function of $V_g$, as illustrated in FIG. 10A and FIG. 10B, respectively.

Figure 11A:
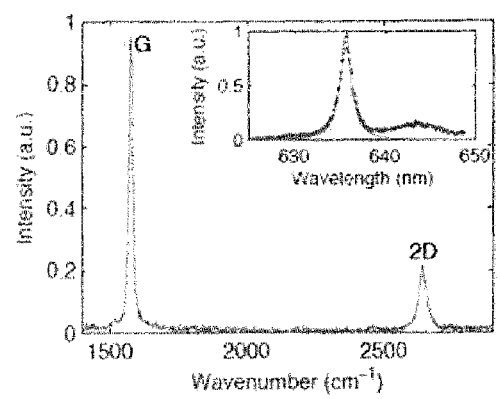
FIG. 11A is a plot of an exemplary Raman spectrum excited at 637 nm observed with the cross-polarization confocal microscope setup of FIG. 8.
Figure 11B:
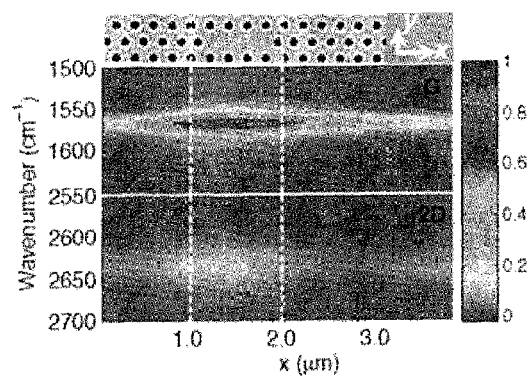
FIG. 11B illustrates the spatial dependence of the cavity-enhanced Raman scattering process in connection with an exemplary planar photonic crystal cavity integrated with graphene.
Figure 11C:
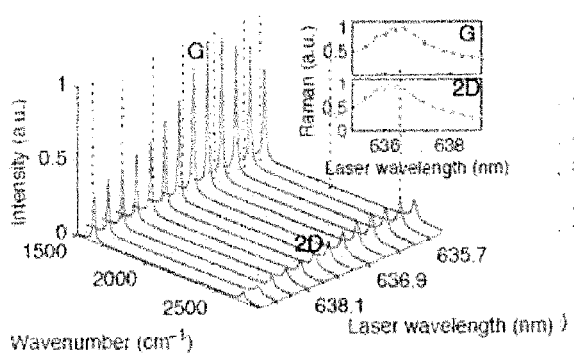
FIG. 11C illustrates laser wavelength dependences of Raman scattering in connection with an exemplary planar photonic crystal cavity integrated with graphene.
Figure 11D:
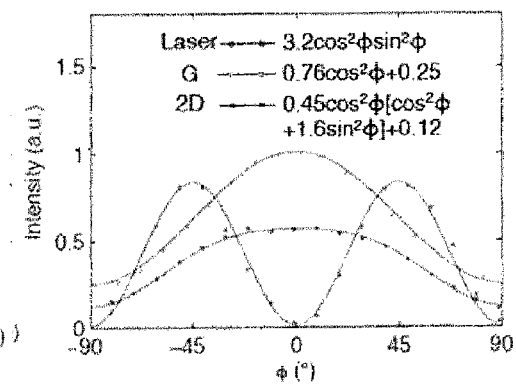
FIG. 11D illustrates polarization dependence of the cavity-enhanced Raman scattering process in connection with an exemplary planar photonic crystal cavity integrated with graphene.

In accordance with another exemplary embodiment, and with reference to FIGS. 11A-C, the techniques disclosed herein can provide for modified Raman scattering via the cavity field enhancement. A GaP PPC cavity with the fundamental mode at a wavelength of approximately 636.3 nm can be used, as illustrated by FIG. 11A, ensuring that the Raman-scattered signal can be in the near infrared for convenient detection. The PPC cavity can be coupled to a CVD-grown graphene layer and can yield a resonance with a Q-factor of about 330. FIG. 11A shows exemplary Raman spectrum of graphene excited at 637 nm. As illustrated therein, prominent features at Raman shifts of 1578 $cm^{-1}$ and 2640 $cm^{-1}$ can be seen corresponding, respectively, to the well-known G and 2D bands. The 2D peak can be weaker than the G peak because of the high doping level of the CVD-grown graphene. FIG. 11B demonstrates the cavity enhancement: when spatially scanning along the x-axis of the PPC, the Raman scattering is enhanced when pumped through the nanocavity defect. The effect of the cavity-enhanced pump can be verified by sweeping the laser wavelength from 635 nm to 639 nm, covering the graphene-cavity resonance. FIG. 11C shows the enhancement in the Raman scattering intensity for resonant excitation of the graphene-cavity. The wavelength dependence of both the G and 2D bands, plotted in the inset of FIG. 11C, can be fit by a Lorentzian function centered at 636.3 nm with a Q factor of 330, consistent with the cavity resonance. In these measurements, the flat baseline can arise from incident radiation that excites the graphene directly, not through the cavity mode. Normalizing the peak Raman signals to the baseline, a 2.8- and a 3.3-fold increase of the G and 2D bands can be obtained, respectively. This wavelength dependence can match the expected cavity-field enhancement, which also increases absorption, with an enhancement factor of 3.41.

In accordance with another exemplary embodiment, the techniques disclosed herein can provide for an opto-electronic detector. For example, a graphene based photodetector can be placed onto a planar photonic crystal cavity. Owing to the enhanced interaction and enhanced optical absorption of photons in the graphene-cavity system, the efficiency of the graphene photodetector can be enhanced. In connection with this embodiment, for example, the graphene layer can be positioned relative to the cavity so as to achieve substantial critical coupling (e.g., coupling to the input and output modes and coupling to the graphene can be substantially equal). A source and drain electrode can be connected to opposite terminals of the graphene layer, and can be connected to a photocurrent detection circuit. The photocurrent detection circuit can be adapted to detect photocurrent from coupling to the mode of the cavity into the graphene layer. In certain embodiments, one of the electrodes can be positioned closer to the resonant cavity relative to the second electrode to induce an internal potential difference on the graphene layer. Moreover, a voltage source can be connected to the first and second electrodes to bias the electrodes.

In accordance with another exemplary embodiment, the techniques disclosed herein can provide for an enhanced saturable absorber employed enhanced light-matter interaction in a cavity integrated with graphene. The enhancement can scale as the Q/V ratio, and the saturation can occur at low power. That is, for example, a PPC cavity integrated with a graphene layer can be adapted to absorb light from a light source, such as in connection with a mode-locked laser. As the intensity of the light increases, the absorption coefficient can decrease (i.e., the absorption becomes saturated). The PPC cavity can amplify the power of the light at the cavity resonance, and thus provide for a saturable absorber with a lower saturation threshold. This can allow mode-locking at lower optical power.

In accordance with another embodiment, the techniques disclosed herein can provide for enhanced bistable switches and memories (e.g., optical buffers) employing saturable absorption. As described herein, when the intensity of input light increases past the saturation threshold, the Q factor of a PPC cavity integrated with graphene can increase. Upon reduction in the intensity in the input light, the Q factor can persist for a period of time. Accordingly because the state of the device (i.e., the Q factor) is history dependent, optical memories and/or switches can be constructed. By reducing the saturation threshold in the PPC cavity, the embodiment can reduce the power consumption of such optical memories and switches.

In accordance with another embodiment, the techniques disclosed herein can provide for enhanced autocorrelation of electromagnetic pulses. For example, two pulses can be collided at a time delay inside the cavity region. The two pulses can be generated, for example, via a beam splitter from an input pulse. One half of the split beam can be directed through a delay line and coupled into the cavity, and the other half can be coupled directly into the cavity. Because the graphene has nonlinear response to the light intensity, the reflected light from the cavity-graphene system will behave nonlinearly with respect to the input pulses. When the two pulses overlap with each other, the graphene is illuminated by light with strong intensity, which can also be enhanced by the cavity mode. The strong illumination causes further saturation of graphene's absorption, giving rise to higher reflectivity of the cavity. By tuning the position of one half of the pulse to change the time delay between the two pulses, the nonlinear behavior of the cavity reflectivity can be recorded. The pulse width can be calculated from the nonlinear reflectivity.

Figure 12A:
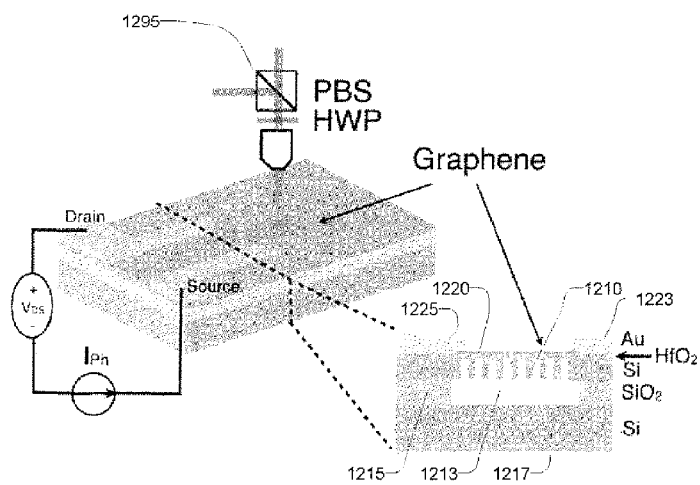
FIG. 12A is a schematic diagram of graphene integrated with a planar photonic crystal cavity in accordance with an exemplary embodiment of the disclosed subject matter.

For purpose of illustration, and not limitation, an exemplary embodiment of a PPC cavity-integrated graphene photodetector will be described with reference to FIGS. 12A-C. FIG. 12A is a schematic diagram of a PPC cavity-integrated graphene photodetector in accordance with an exemplary embodiment of the disclosed subject matter. For example, a PPC can be disposed on silicon dioxide supports 1215 on a silicon substrate base 1217 to create an air cavity 1213 adjacent the PPC cavity 1210. A layer of graphene 1220 can be positioned adjacent the PPC cavity 1210. A source electrode 1223 and drain electrode 1225 can be electrically coupled with the graphene layer, as described herein.

For purpose of illustration and not limitation, an air-suspended PPC cavity 1210 can be fabricated on a silicon-on-insulator wafer with a 260 nm thick silicon (Si) membrane, using a combination of electron beam lithography (EBL) and dry/wet etching steps. The PPC can have a lattice spacing of a=450 nm and hole radius of 0.29a. A linear defect in the center of the PPC lattice can form a long PPC cavity 1210 (e.g., as shown in FIG. 12B), which can produce bounded cavity modes. A layer of 20 nm hafnium oxide ($HfO_2$), which can be deposited by atomic layer deposition (ALD), can electrically isolates the metal electrodes (source 1223 and drain 1225) of graphene 1220 from the Si layer. Monolayer graphene can be prepared by mechanical exfoliation and then transferred onto the PPC cavity 1210 with a precision alignment technique, e.g., the wet and/or dry transfer techniques discussed herein. The source and drain contacts can be defined by EBL, Ti/Pd/Au (1/20/50 nm) deposition, and lift-off.

Figure 12C:
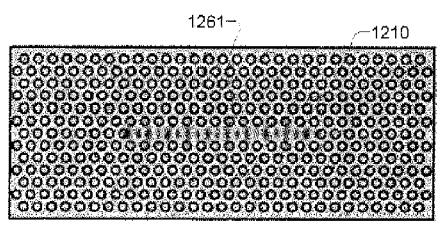
FIG. 12C illustrates the stimulated energy distribution of a resonant mode of graphene integrated with a planar photonic crystal cavity in accordance with an exemplary embodiment of the disclosed subject matter.
Figure 12B:
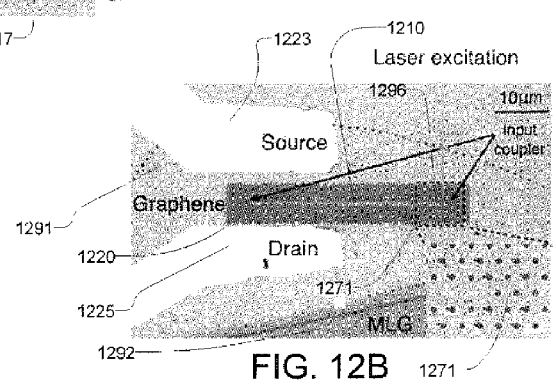
FIG. 12B is an optical image of a graphene photodetector integrated with a planar photonic crystal cavity in accordance with an exemplary embodiment of the disclosed subject matter.

FIG. 12B is an optical image of an exemplary PPC cavity-integrated graphene photodetector in accordance with an exemplary embodiment of the disclosed subject matter. A single layer graphene 1220 can cover the silicon surface 1291 in the region show, while a multi-layer graphene (MLG) 1292 can be used in the area shown. Two metal electrodes (source 1223 and drain 1225) can be deposited to electrically contact the graphene 1220. The inset depicts an exemplary SEM image 1271 of one end of the PPC cavity 1210. For purpose of illustration and not limitation, enlarged air holes, e.g., at a period of twice the lattice spacing (2a), can form a grating in the PPC lattice, which can enhance the coupling between graphene 1220, cavity 1210, and vertical incident light. For example and not limitation, the scale bar of the inset image 1271 can represent 500 nm.

FIG. 12C illustrates the stimulated energy distribution of a resonant mode of graphene integrated with a planar photonic crystal cavity in accordance with an exemplary embodiment of the disclosed subject matter. For purpose of illustration and not limitation, a FDTD simulation can show a localized resonant mode 1261 inside the PPC cavity 1210. For example, numerical simulation of the optical field in the PPC cavity 1210 can show a localized optical field. At the end of the cavity 1210, defects (e.g., as show in the inset 1271 of FIG. 12B) can include a series of perturbations in the PPC lattice at a spatial frequency of $k_x=\pi/2a$, which can serve to scatter the light vertically upward. This additional loss also can be used to match the extrinsic and internal photon loss rates to approach the critical coupling regime of the graphene-cavity system, as discussed herein.

The PPC cavity 1210 can be characterized using an excitation source 1295, e.g., a vertical cross-polarization confocal microscope with a broad-band (super-continuum laser) excitation source as illustrated in FIG. 12A. Vertical incident light can be coupled at 45° to the cavity polarization and collected at −45° to reduce background light reflected without coupling into the polarized cavity modes. The reflection can be analyzed using any suitable spectrometer, for example, a commercial spectrometer with a resolution of 0.05 nm.

FIG. 13A depicts a plot of the reflection spectra of a planar photonic crystal cavity integrated with graphene in accordance with an exemplary embodiment of the disclosed subject matter. The reflection spectra are depicted for the PPC cavity without graphene and with graphene. For purpose of illustration and not limitation, FIG. 13A illustrates the reflection spectrum of the PPC cavity 1210 before (i.e. without) graphene deposition 1302 and after (i.e. with) graphene deposition 1301. Multiple peaks at a wavelength range between 1520 nm and 1550 nm can correspond to the resonant modes within the PPC photonic bandgap. After graphene is transferred onto the cavity, the resonant peaks can be lowered and broadened, which can correspond to excess loss in the cavity due to graphene absorption. For an exemplary multi-mode cavity depicted, the intensity reflection coefficient R(ω) can be obtained quantitatively from coupled mode theory for an ensemble of cavity modes coupled to a common waveguide mode, $$R(\omega) = \sum_j \frac{n_j^2 k_{cj}^2}{(w_{0j} + \Delta\omega j - \omega)^2 + (k_{cj}/2 + k_{cgi}/2)^2}, \quad (6)$$

where $k_{cgi}$ can denote the intrinsic cavity decay rates of mode j, and $\eta_j$ can be the coupling efficiencies between these cavity modes and the approximately Gaussian modes of the microscope objective. Graphene can induce additional cavity loss rates $k_{cgi}$ and cavity resonant frequency shifts $\Delta\omega_j$. With $\Delta\omega_j=0$ and $k_{cgi}=0$, the values of $\omega_{0j}$, $k_{cj}$, and $\eta_j$ can be extracted for different modes by fitting the cavity reflection spectra prior to loading with graphene.

FIG. 13B depicts a plot of a portion of the reflection spectra of a planar photonic crystal cavity integrated with graphene for the spectral range 1522-1541 nm in accordance with an exemplary embodiment of the disclosed subject matter. The dashed curve in the top panel can show the fitting of Equation (6) and the solid curve can show the reflection data measured experimentally without graphene 1302. The dashed and solid curves in the bottom panel can show the calculated and measured cavity reflection after loading with graphene 1301, respectively. For example and not limitation, the fit by Equation (6) for the reflection without graphene 1302 can be plotted, as depicted in top panel of FIG. 13B, which can show agreement with the six peaks measured experimentally. Using the same approach, the values of $k_{cgi}$ and $\Delta\omega_j$ can be extracted from the reflection of the cavity after coupled to graphene 1301 and the fitting curve can be plotted, as shown in the bottom panel of FIG. 13B. Comparing the fit by Equation (6) to the measured reflection with graphene 1301, the fitting can show good agreement from 1522 nm to 1541 nm.

FIG. 13C depicts a plot of the photocurrent spectra of a planar photonic crystal cavity integrated with graphene in accordance with an exemplary embodiment of the disclosed subject matter. For purpose of illustration and not limitation, the photocurrent spectra of the graphene 1220 photodetector can be measured at the location 1296 shown in FIG. 12B with a bias voltage $V_{DS}=0.2V \cdot V_{DS}=0.2V$ For example, the photocurrent of the graphene 1220 photodetector can be measured using a tunable narrowband laser source (e.g. a commercially available Anritsu MG9638) focused onto the sample with a spot size of 1 µN. The continuous wave (cw) laser can be modulated at 20 kHz, and the photocurrent can be recorded on a lock-in amplifier (e.g. a commercially available SR830) after a current pre-amplifier (e.g. a commercially available SR570). All measurements can be performed under ambient conditions. The photocurrent can be measured at the location 1296 in FIG. 12B while sweeping the incident wavelength from 1520 nm to 1555 nm to obtain the photocurrent spectra. The drain-source bias ($V_{DS}$) can be kept at 0.2 V and the input power can be 250 µW. As displayed in FIG. 13C, the photocurrent can show multiple spectral peaks, which can overlap with the resonant peaks observed in the cavity reflection. For example and not limitation, for wavelengths below 1550 nm, the input light can be enhanced in the PPC line defect, which can increase the absorption and correspondingly the photocurrent in graphene 1220. Additionally, for wavelengths above 1550 nm, the photocurrent can drop to a uniformly small value. In this regime, the incident light can be detuned from any cavity modes. For purpose of illustration and not limitation, the residual photocurrent seen in FIG. 13C can be attributed to the scattering and in-plane guiding of non-resonant light. Comparing the photocurrent when the incident light is on a cavity resonance and off a cavity resonance, up to an eight-fold enhancement of the photocurrent at the wavelength of 1535 nm can be observed. Using the coupled graphene-cavity model described herein, the absorption coefficient into graphene (the fraction of vertically incident light that is ultimately absorbed in graphene) can be expressed as $$A_g(\omega) = \sum_j \frac{n_j k_{cgi}}{(w_{0j} + \Delta\omega - \omega)^2 + (k_{cj}/2 + k_{cgi}/2)^2}, \quad (7)$$

The absorption of graphene 1220 as a function of input wavelength can be deduced using the parameters extracted from the reflection curves in FIGS. 13A-B. FIG. 13D depicts a plot of a portion of the photocurrent spectra of a planar photonic crystal cavity integrated with graphene for the spectral range 1520-1540 nm in accordance with an exemplary embodiment of the disclosed subject matter. The measured photocurrent spectra (solid curve) of the graphene 1220 detector between 1520 nm and 1540 nm can be consistent with the absorption spectra (dashed curve) of graphene 1220 derived from coupled mode theory. As shown in FIG. 13D, the absorption of graphene normalized by the microscope-cavity coupling efficiency η (dashed curve) can be plotted with the measured photocurrent in graphene (solid curve). The overlap between the two curves can indicate that the photocurrent enhancement can originate from the enhanced absorption of graphene 1220 in the PPC cavity 1210. The graphene 1220 detector can operate with a broad bandwidth over the entire cavity modes in the photonic band gap. As the wavelength approaches the band edge of the photonic crystal, the free spectral range of the resonant peaks can become smaller, which can result in overlapping of resonant peaks. Therefore, the photocurrent can be enhanced over a broad spectral range of about 10 nm, as shown in FIG. 13C.

FIG. 14A is a scanning electron microscope (SEM) image of a planar PPC integrated with graphene in accordance with an exemplary embodiment of the disclosed subject matter. FIGS. 14B, 14C, and 14D each depicts the spatial mapping of the photocurrent of areas 14b, 14c, and 14d indicated in FIG. 14A in accordance with an exemplary embodiment of the disclosed subject matter. The dashed lines shown in FIGS. 14B and 14C can correspond to the boundary of the metal electrodes (source 1423 and drain 1425).

The spatial mapping of the photocurrent in FIGS. 14B-D can elucidate the coupling mechanism into the cavity modes. FIGS. 14B, 14C, and 14D can map the photocurrent at the locations 14*b*, 14*c*, 14*d* indicated in the SEM image of FIG. 14A with an input excitation wavelength of 1535 nm and bias voltage ($V_{DS}$) of 0.2V. For purpose of illustration and not limitation, in the region where graphene is contacted by two metal electrodes (source 1423 and drain 1425), electron-hole pairs can be generated by single-pass absorption of the vertically incident beam and then can be separated by the local electric field. Therefore, photocurrent can be generated in the channel area shown in FIG. 14B and left side of FIG. 14C between the boundaries shown by the dashed lines. For purpose of illustration in this exemplary embodiment, since the metal electrodes 1423, 1425 cover a portion (e.g. approximately 50%) of the graphene sheet 1420 on the PPC cavity 1410, the remainder (e.g. the other half) of the graphene sheet 1420 can have nearly zero photocurrent when laser excites these areas, as shown in the right side of FIG. 14C and FIG. 14D. Additionally, a bright spot at the end of the cavity defect in FIG. 14D can indicate that photocurrent can be generated when light couples into the PPC cavity 1410 through the input coupler (e.g. as shown in insert 1271). In this graphene-cavity system, as indicated in Equation (7), the peak absorption into graphene can occur when $k_c/k_{cg}=1$ with a value of η. Therefore, the cavity design can be enhanced by introducing additional loss via the directional couplers at the ends of the PPC cavity 1410 to match $k_c$ and $k_{cg}$, while increasing η. For example and not limitation, the ratio of $k_c/k_{cg}$ for an exemplary device characterized as described herein can be 1.3 and the coupling efficiency η can be 0.04. Because of low vertical coupling efficiency, the responsivity of the exemplary device can be 0.6 mA/W, which can correspond to an internal quantum efficiency of 0.35%.

FIG. 14E depicts a plot of the photocurrent in a planar photonic crystal cavity integrated with graphene in accordance with an exemplary embodiment of the disclosed subject matter. For example and not limitation, the photocurrent data (e.g., photocurrent data as depicted in FIGS. 14B-14D) can be traced with graphene 1481 and without graphene 1482 coupled to the PPC cavity 1410. The trace across the coupler of the PPC cavity 1410 can be normalized to the coupling efficiency η, and the edge of the metal electrodes (source 1423 and drain 1425) can be shown by the shaded regions. For purpose of illustration, two traces from FIG. 14B (curve 1482) and FIG. 14D (curve 1481) can be plotted in FIG. 14E to compare the photocurrent due to single-pass absorption of graphene and its enhancement after coupling to the cavity. The trace across the PPC cavity 1410 coupler in FIG. 14D can be normalized to η. As shown in FIG. 14E, the photocurrent enhancement can reach a peak factor of 25 when the coupling efficiency is enhanced. In some exemplary devices, the coupling efficiency η can exceed 45% with an on-chip edge coupler or tapered fiber coupling, which can indicate that overall efficient light detection can be possible. In some exemplary devices, the photocurrent can be generated in the middle of the graphene channel 1420, above the cavity 1410 line defect. As observed in FIGS. 14A and 14B, the photocurrent can exhibit stronger response in the vicinity of the metal electrodes (source 1423 and drain 1425). This enhancement can be attributed to the built-in electric potential introduced by the doping of the metal on graphene 1420. This can indicate that the possibility to further improve the performance of a graphene detector by placing the metal electrodes 1423, 1425 closer to the edge of the cavity 1410.

The controlled enhancement of photoresponsivity in a graphene photodetector by coupling to slow light modes in a long photonic crystal linear defect cavity can be demonstrated, as described herein. Near the Brillouin zone (BZ) boundary, spectral coupling of multiple cavity modes can result in broadband photocurrent enhancement, e.g., from 1530 nm to 1540 nm. Away from the BZ boundary, individual cavity resonances can enhance the photocurrent (e.g. by eight-fold) in narrow resonant peaks. Optimization of the photocurrent via critical coupling of the incident field with the graphene-cavity system can be used, as described herein. The enhanced photocurrent discussed herein can demonstrate the feasibility of a wavelength-scale graphene photodetector for efficient photodetection with high spectral selectivity and broadband response.

A graphene photodetector integrated in a linear defect cavity defined in a planar PPC can be demonstrated, as described herein. A single graphene layer can strongly couple to the cavity evanescent field, which can increase the light-matter interaction in graphene for photocurrent generation. Coupled mode theory can be used to predict peak absorption into the graphene absorber when the intrinsic cavity loss rate, $k_c$, equals the loss rate into the graphene sheet, $k_{cg}$, as described herein. Upon enhancement of the cavity design as described herein, nearly critical coupling can be obtained with $k_{cg}/k_c \approx 1.3$, and an eight-fold enhancement of photocurrent in the graphene photo detector can be observed. The observed reflectivity and photocurrent spectra in the graphene detector can agree with the coupled graphene-cavity model. Spatial mapping of the photocurrent can allow a comparison of the response of the graphene detector with and without optical enhancement via the PPC cavity.

As described herein, enhancement of photocurrent in a graphene photodetector by coupling the graphene absorber to a photonic crystal cavity can be up to eight-fold. Compared to single-pass absorption, if light were efficiently coupled into the defect state, e.g., η~1, the absorption efficiency can reach up to 95% with $k_c/k_{cg}=1.3$, as described herein. Coupling efficiency from waveguides into photonic crystal cavities can be accomplished with near unity efficiency. At the Brillouin zone (BZ) boundary of the PPC, the cavity resonant modes can overlap and span a broad band (e.g. 10 nm) of enhanced absorption and photocurrent in graphene. The photocurrent can show good agreement with the calculated absorption spectra from the optical reflection data based on a coupled graphene and cavity model, as described herein. Graphene photodetectors can enable high-speed optical communication. The PPC-cavity-coupled graphene devices as described herein can show the feasibility of efficient and ultra-compact graphene photodetectors in a chip-integrated architecture.

Certain properties of graphene have generated interest in developing opto-electronics devices based on the material. Examples include graphene-based high speed electro-optical modulators, photodetectors, saturable absorbers, and non-linear media for four-wave mixing. Intrinsic graphene can exhibit absorption of 2.3% in the infrared to visible spectra range. This absorption coefficient can be high for a single atomic layer, and for certain applications, a larger absorption coefficient can be used. To increase the light-matter interactions in graphene, approaches can include the integration of graphene with optical micro-cavities, plasmonic nanostructures, and silicon photonic waveguides.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A device for coupling input light from a light source into graphene, comprising:
   a planar photonic crystal having a resonant cavity characterized by a mode volume and a quality factor, adapted to receive the input light into one or more modes and an evanescent field generated in response thereto; and
   at least one graphene layer positioned adjacent the planar photonic crystal to at least partially overlap with the evanescent field of the resonant cavity, whereby at least one mode of the resonant cavity is coupled into the graphene layer via evanescent coupling.

2. The device of claim 1, wherein the mode volume comprises a volume on the order of a cubic wavelength, wherein the input light comprises radiation having a bandwidth within the near infrared to visible spectrum, and wherein the at least one resonant mode comprises a mode having a bandwidth within the near infrared to visible spectrum.

3. The device of claim 1, further comprising a coupling device selected from the group consisting of a waveguide or an objective lens, positioned and adapted to couple the input light into the resonant cavity.

4. The device of claim 1, wherein the planar photonic crystal comprises a crystal formed from one or more of the group consisting of silicon, germanium, gallium arsenide, gallium phosphide, indium phosphide, or polymers.

5. The device of claim 1, wherein the at least one mode of the resonant cavity comprises a mode overcoupled into the graphene layer, further comprising a voltage source electrically coupled via a first electrode to the graphene layer, and via a second electrode to a second layer to create an electric field perpendicular to the graphene layer upon application of a voltage, wherein the voltage source is adapted to apply a voltage tuned to induce Pauli blocking and thereby modulate a transmission and refractive index of the graphene layer, thereby providing electro-optic modulation.

6. The device of claim 5, wherein the second layer includes a silicon substrate layer adjacent the planar photonic crystal opposite the graphene layer.

7. The device of claim 5, wherein the second layer includes a transparent contact formed from one or more of the group consisting of indium tin oxide, a conductive polymer, or an electrolyte.

8. The device of claim 7, wherein the transparent contact layer is disposed between the graphene layer and the planar photonic crystal.

9. The device of claim 7, wherein the transparent contact layer is disposed adjacent the graphene layer opposite the planar photonic crystal.

10. The device of claim 1, wherein the at least one mode of the resonant cavity comprises a mode critically coupled into the graphene layer, further comprising a photocurrent detection circuit, electrically coupled with the graphene layer via a first and second electrode, adapted to detect photocurrent from coupling of the at least one mode of the resonant cavity into the graphene layer.

11. The device of claim 10, wherein the first electrode is positioned closer to the resonant cavity relative the second electrode to induce an internal potential difference on the graphene layer.

12. The device of claim 10, further comprising a voltage source electrically coupled to the first and second electrodes, to create a bias.

13. The device of claim 1, wherein the light source comprises a light source adapted to vary the intensity of the input light and a resulting intensity of the at least one resonant mode of the resonant cavity, and configured to emit light having an intensity to saturate the graphene layer and increase the quality factor of the resonant cavity, thereby creating a bistablity.

14. A method for coupling input light into a planar photonic crystal having a resonant cavity with a mode volume, a quality factor, and at least one mode, comprising:
   providing a graphene layer adjacent the planar photonic crystal to at least partially overlap with an evanescent field of at least one of the at least one mode of the resonant cavity;
   controlling one or more optical properties of the graphene layer;
   coupling an input light into the resonant cavity; and
   detecting a characteristic in response to the input light.

15. The method of claim 14, wherein controlling the one or more optical properties of the graphene layer includes one or more of the group consisting of positioning the graphene layer to achieve a predetermined level of coupling, electrically gating the graphene layer to modulate a transmission and refractive index of the graphene layer, electrically biasing the graphene layer to enhance a photocurrent therein, or varying the intensity of the input light to saturate the graphene layer and create a bistability.

16. The method of claim 15, wherein detecting the characteristic in response to the input light includes processing an output current from the graphene layer corresponding to the input light coupled into the resonant cavity.

17. The method of claim 14, wherein detecting the characteristic includes processing an output light from the resonant cavity.

18. The method of claim 17, further comprising modulating transmission of the graphene layer, wherein processing the output light from the resonant cavity includes processing transmitted or reflected light and detecting a modulation of transmission intensity of the graphene layer.

19. The method of claim 17, further comprising varying the intensity of the input light to saturate the graphene layer and create a bistability, wherein processing the output light from the resonant cavity further includes detecting a state of the graphene layer corresponding to the bistability.

20. The method of claim 19, further comprising operating the graphene layer as one or more of a bistable switch, an optical memory, or an optical logic gate.

* * * * *